United States Patent
Ambur et al.

(10) Patent No.: US 11,709,299 B2
(45) Date of Patent: Jul. 25, 2023

(54) OPTICAL ASSEMBLY WITH PROTECTIVE COATING

(71) Applicant: 3M INNOVATIVE PROPERTIES COMPANY, St. Paul, MN (US)

(72) Inventors: Gregg A. Ambur, San Clemente, CA (US); Benjamin G. Sonnek, Mahtomedi, MN (US); Jo A. Etter, Kirkland, WA (US); Timothy L. Wong, St. Paul, MN (US); Thomas P. Klun, Lakeland, MN (US); Richard J. Pokorny, Maplewood, MN (US); Benjamin R. Coonce, South St. Paul, MN (US); Douglas S. Dunn, Woodbury, MN (US); Henry A. Kostalik, IV, Minneapolis, MN (US); Christopher S. DeGraw, Eagan, MN (US); John R. Jacobson, Newport, MN (US); Chunjie Zhang, Shoreview, MN (US); Jung-Sheng Wu, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 300 days.

(21) Appl. No.: 17/044,685

(22) PCT Filed: Jun. 7, 2019

(86) PCT No.: PCT/IB2019/054778
§ 371 (c)(1),
(2) Date: Oct. 1, 2020

(87) PCT Pub. No.: WO2019/239271
PCT Pub. Date: Dec. 19, 2019

(65) Prior Publication Data
US 2021/0364682 A1    Nov. 25, 2021

Related U.S. Application Data

(60) Provisional application No. 62/685,119, filed on Jun. 14, 2018.

(51) Int. Cl.
*G02B 5/28* (2006.01)
*G02B 1/04* (2006.01)
(Continued)

(52) U.S. Cl.
CPC ............. *G02B 5/285* (2013.01); *G02B 1/041* (2013.01); *G02B 1/14* (2015.01); *G02B 5/287* (2013.01);
(Continued)

(58) Field of Classification Search
None
See application file for complete search history.

(56) References Cited

U.S. PATENT DOCUMENTS 4,262,072 A    4/1981 Wendling
5,882,774 A    3/1999 Jonza
(Continued)

FOREIGN PATENT DOCUMENTS

JP    06258604 A    9/1994
JP    2011118190 A    6/2011
(Continued)

OTHER PUBLICATIONS

International Search report for PCT International Application No. PCT/IB2019/054778 dated Oct. 30, 2019, 7 pages.

*Primary Examiner* — Derek S. Chapel
(74) *Attorney, Agent, or Firm* — Clifton F. Richardson

(57) ABSTRACT

An optical assembly including an optical element insert molded directly onto an optical stack is provided. The optical stack includes an optical film and may include a liner with the optical film being disposed between the optical
(Continued)

element and the liner. The liner, if included, is removable from the optical film without substantial damage to the optical film. An outermost layer of the optical film may be diffusion bonded to a major surface of the optical element. The optical film includes a protective coating having an average thickness of no more than 30 micrometers. The protective coating includes an at least partially cured composition. The composition includes 70 to 96 weight percent of urethane (meth)acrylate compound having an average (meth)acrylate functionality of 2 to 9.5, and 2 to 20 weight percent of (meth)acrylate monomer having a (meth)acrylate functionality of 1 to 2.

17 Claims, 17 Drawing Sheets

(51) Int. Cl.
*G02B 1/14* (2015.01)
*G02B 5/30* (2006.01)
*G02B 5/08* (2006.01)
*B29D 11/00* (2006.01)

(52) U.S. Cl.
CPC ........ *G02B 5/305* (2013.01); *B29D 11/00548* (2013.01); *G02B 5/0816* (2013.01); *G02B 5/3025* (2013.01)

(56) References Cited

U.S. PATENT DOCUMENTS

| | | | |
|---|---|---|---|
| 6,420,451 B1 | 7/2002 | Lin et al. | |
| 6,609,795 B2 | 8/2003 | Weber | |
| 6,613,433 B2* | 9/2003 | Yamamoto | G02B 5/3033 |
| | | | 359/488.01 |
| 6,788,463 B2 | 9/2004 | Merrill | |
| 6,991,695 B2 | 1/2006 | Tait | |
| 9,017,819 B2 | 4/2015 | Kues | |
| 9,555,589 B1 | 1/2017 | Ambur | |
| 9,557,568 B1 | 1/2017 | Ouderkirk | |
| 11,065,855 B2* | 7/2021 | Klun | G02B 5/26 |
| 2002/0111390 A1* | 8/2002 | Lin | C09D 4/06 |
| | | | 522/83 |
| 2009/0269568 A1 | 10/2009 | Kuhlmann | |
| 2010/0003523 A1 | 1/2010 | Sharygin | |
| 2015/0146166 A1* | 5/2015 | Weber | G02B 5/283 |
| | | | 359/359 |
| 2016/0068708 A1 | 3/2016 | Tanabiki | |
| 2017/0017077 A1 | 1/2017 | Tang et al. | |
| 2017/0299898 A1* | 10/2017 | Gallina | B32B 27/36 |
| 2017/0321060 A1 | 11/2017 | Samantara | |
| 2021/0208320 A1* | 7/2021 | Ambur | B29D 11/00865 |
| 2021/0221080 A1* | 7/2021 | Coonce | B29D 11/00009 |

FOREIGN PATENT DOCUMENTS

| | | |
|---|---|---|
| JP | 2015205410 | 11/2015 |
| WO | 2017192240 A1 | 11/2017 |
| WO | WO 2018-102607 | 6/2018 |
| WO | WO 2018-147935 | 8/2018 |
| WO | WO 2018-163009 | 9/2018 |
| WO | WO 2019-079033 | 4/2019 |

* cited by examiner

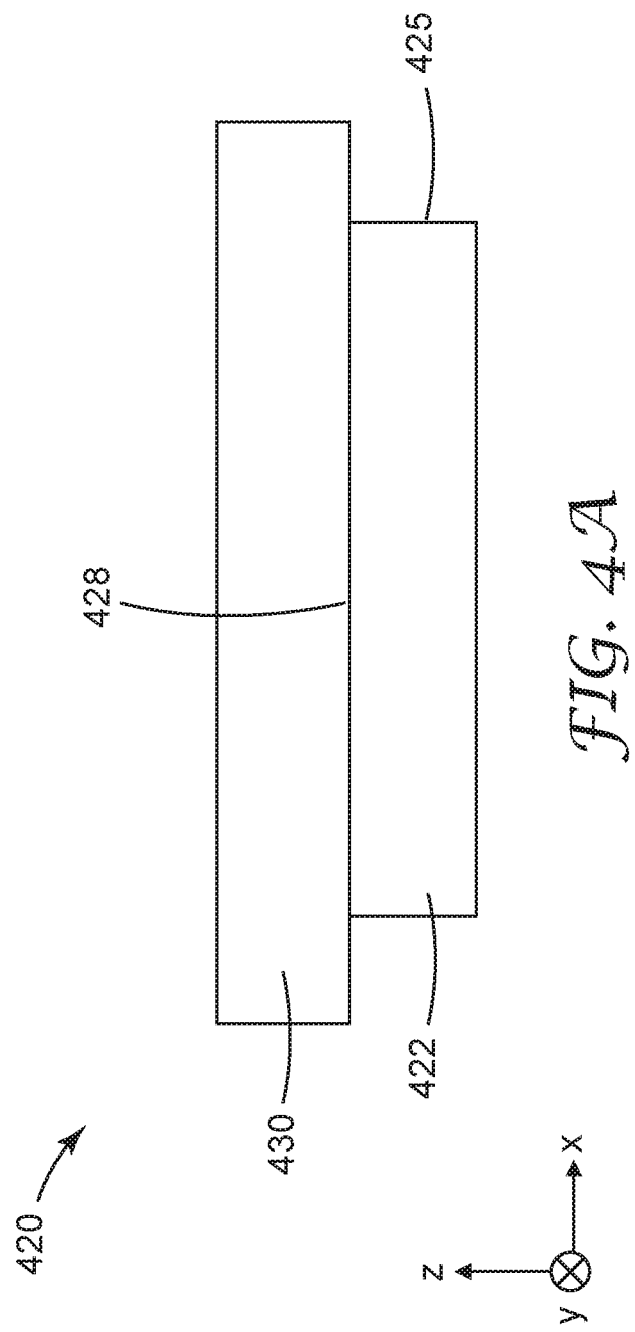

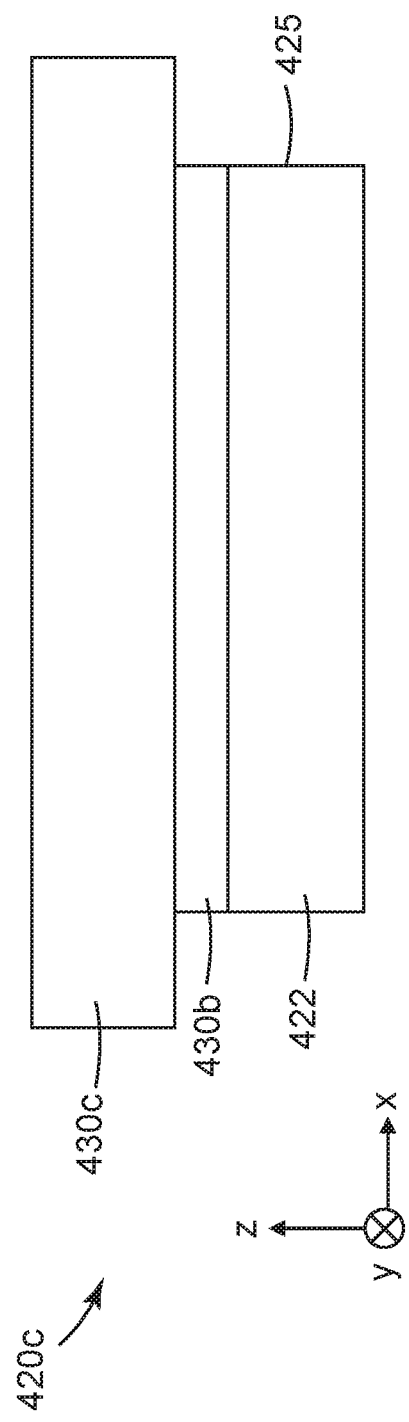
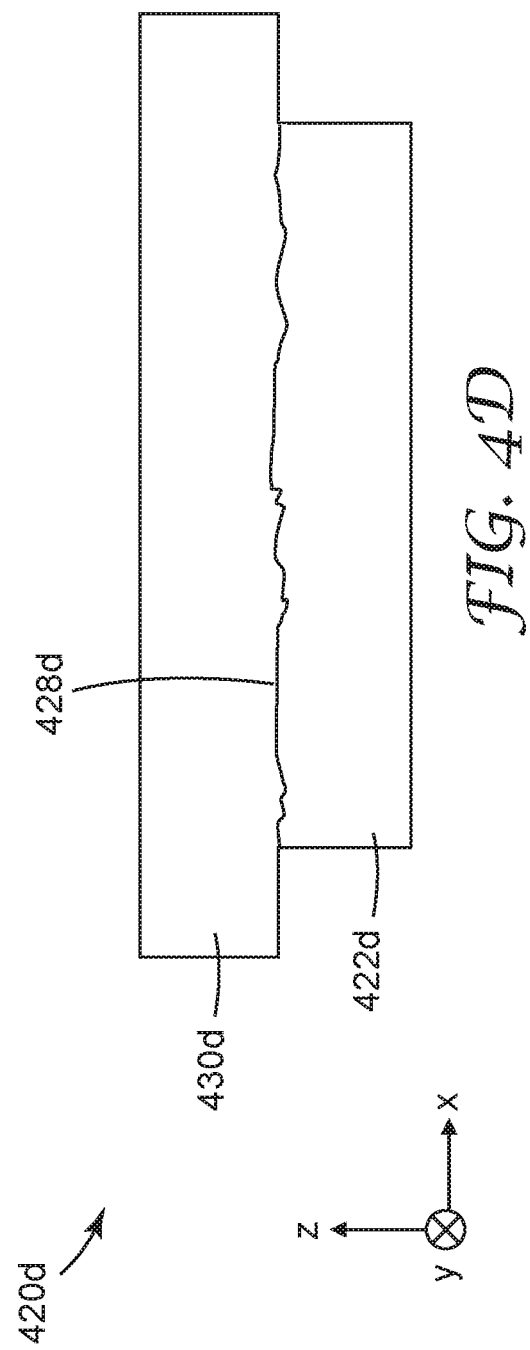

OPTICAL ASSEMBLY WITH PROTECTIVE COATING

BACKGROUND

In various applications, an optical film may be disposed on an optical element.

SUMMARY

In some aspects of the present description, an optical assembly including an optical element insert molded directly onto an optical stack is provided. The optical stack includes an optical film and a liner, the optical film being disposed between the optical element and the liner. The liner is removable from the optical film without substantial damage to the optical film. The optical film includes a protective coating facing the liner and having an average thickness of no more than 30 micrometers.

In some aspects of the present description, an optical assembly including an integrally formed multilayer optical film and a first optical element injection insert molded directly onto the optical film is provided. The optical film includes a plurality of alternating polymeric layers reflecting or transmitting light primarily by optical interference. Each location over at least 80% of a total area of the optical film has a reflectance greater than about 80% for normally incident light having a same predetermined wavelength and a same first polarization state. A melting temperature of the first optical element is substantially larger than a glass transition temperature of the optical film. The optical film includes a protective coating having an average thickness of no more than 30 micrometers where the protective coating faces away from the first optical element.

In some aspects of the present description, an optical assembly including an integrally formed multilayer optical film and an optical element insert molded directly onto the optical film is provided. The optical film includes a plurality of alternating polymeric layers reflecting or transmitting light primarily by optical interference. The optical film is diffusion bonded to the optical element. The bonding of the optical film to the optical element is stronger than an interlayer bonding between at least one pair of immediately adjacent layers in the optical film. The optical film includes a protective coating having an average thickness of no more than 30 micrometers where the protective coating faces away from the optical element.

In some aspects of the present description, an optical assembly including an integrally formed multilayer optical film and an optical element insert molded directly onto the optical film is provided. The optical film is diffusion bonded to the optical element. The optical film includes a plurality of alternating polymeric layers reflecting or transmitting light primarily by optical interference. Each location over at least 90% of a total area of the optical film having a reflectance greater than about 90% for normally incident light having a same predetermined wavelength and a same first polarization state. The optical film includes a protective coating having an average thickness of no more than 30 micrometers where the protective coating faces away from the optical element.

In some aspects of the present description, an optical assembly including an optical film and a lens insert molded directly onto the optical film is provided. The optical film includes a plurality of alternating polymeric layers reflecting or transmitting light primarily by optical interference. Each location over at least 90% of a total area of the optical film has a reflectance greater than 90% for normally incident light having a same predetermined wavelength and a same first polarization state. The lens has an optical retardance varying more along a largest lateral dimension in a first direction and varying less along a largest lateral dimension in an orthogonal second direction. The optical retardance at each location on the lens being no more than about 10 nm. The optical film includes a protective coating having an average thickness of no more than 30 micrometers where the protective coating faces away from the lens.

In some aspects of the present description, an optical assembly including a lens and a multilayer optical film having opposing first and second major surfaces where the first major surface is disposed on a first portion of a first side of the lens is provided. Each location over at least 80% of a total area of the multilayer optical film has a reflectance greater than about 80% for normally incident light having a same predetermined wavelength and a same first polarization state. A second portion of the first side of the lens is substantially flush with the second major surface of the multilayer optical film. The multilayer optical film includes a protective coating having an average thickness of no more than 30 micrometers where the protective coating faces away from the lens.

In some aspects of the present description, an optical assembly including a lens and an optical stack disposed on a major surface of the lens is provided. The lens at least partially wraps around an edge of the optical stack. The optical stack includes a protective coating having an average thickness of no more than 30 micrometers where the protective coating faces away from the lens In some aspects of the present description, an optical assembly includes a lens having a first major surface defining a curved recess therein and a multilayer optical film adhered and conforming to the curved recess. The multilayer optical film includes a protective coating having an average thickness of no more than 30 micrometers where the protective coating faces away from the lens.

In some aspects of the present description, an optical assembly including an optical film and a lens injection molded directly onto the optical film is provided. Each location over at least 80% of a total area of the optical film has a reflectance greater than about 80% for normally incident light having a same predetermined wavelength and a same first polarization state. The lens has an optical retardance of no more than about 10 nm at each location over at least 80% of a major surface of the lens. A lens thickness at a first lens location being at least about 20% greater than a lens thickness at a second lens location. The optical film includes a protective coating having an average thickness of no more than 30 micrometers where the protective coating faces away from the lens.

The protective coating included in the above optical assemblies, and other optical assemblies of the present description, typically includes an at least partially cured composition, where the composition includes:

a) 70 to 96 weight percent of urethane (meth)acrylate compound having an average (meth)acrylate functionality of 2 to 9.5, based on the total weight of components a) to d);

b) 2 to 20 weight percent of (meth)acrylate monomer having a (meth)acrylate functionality of 1 to 2, based on the total weight of components a) to d), wherein the (meth)acrylate monomer does not include a urethane (meth)acrylate compound;

c) optional 0.5 to 2 weight percent of silicone (meth) acrylate, based on the total weight of components a) to d);
d) optional effective amount of photoinitiator;
e) optional inorganic nanoparticles; and
f) optional solvent.

BRIEF DESCRIPTION OF THE DRAWINGS

FIG. 4A is a schematic cross-sectional view of an optical stack;

FIGS. 4C-4D are schematic cross-sectional views of optical stacks;

DETAILED DESCRIPTION

Figure 1A:
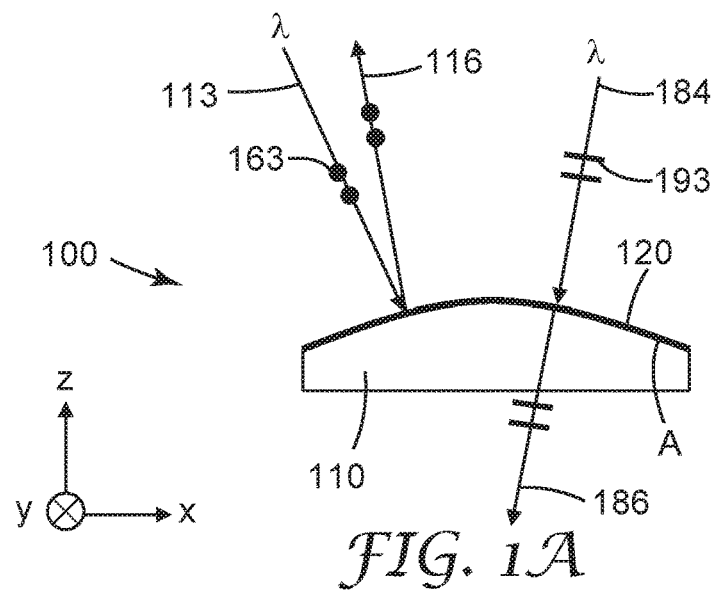
FIGS. 1A-1B are schematic cross-sectional views of optical assemblies.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

There are a wide variety of applications where it is desired to dispose an optical film on an optical element. For example, a display may utilize a polarizing beam splitter (PBS) where an optical film is disposed on a hypotenuse of a prism. The optical film may be a multilayer polymeric optical film reflecting or transmitting light primarily by optical interference. As another example, a display system may utilize a folded optics system including a partial reflector and a reflective polarizer disposed adjacent to and spaced apart from one another as described in U.S. Pat. No. 9,557,568 (Ouderkirk et al.), for example. In some cases, it is desired to dispose the reflective polarizer on a major surface of a lens.

Optical assemblies of the present description typically include an optical film, such as an integrally formed multilayer optical film, disposed on an optical element, such as an optical lens. For example, the optical film may be disposed on either major surface of a biconvex lens, a plano-convex lens, a positive meniscus lens, a negative meniscus lens, a plano-concave lens, or a biconcave lens. In some embodiments, the optical element is injection molded onto the optical film so that a diffusion bond forms between the optical film and optical element. In some embodiments, the diffusion bond is stronger than an interlayer bond between adjacent layers in the optical film. In some embodiments, the optical element resulting from the insert molding process has an optical birefringence of less than 10 nm and in some embodiments, the optical birefringence varies more along one direction than along an orthogonal direction. Related optical assemblies are described in U.S. Prov. Appl. No. 62/574,921 filed Oct. 20, 2017 and titled "Optical Assembly".

The optical film typically includes a protective coating, such as a hardcoat, disposed at an outermost surface of the optical film and facing away from the optical element. The optical film may be disposed on a concave surface or a convex surface or a substantially flat surface of the optical element with the protective coating on a major surface of the optical film opposite the optical element. The protective coating may be an abrasion-resistant layer that protects the optical film from surface damage such as gouging and scuffing that may occur during handling and use. The present description provides protective layer compositions that can be coated onto an optical film, such as a multilayer optical film including alternating polymeric layers reflecting and transmitting light primarily by optical interference and cured. The optical film including the protective layer can be thermoformed into a desired shape without cracking of the protective layer in at least a portion of the optical film intended to be subsequently used in an optical assembly (e.g., any cracking that is only in edge portions of the optical film that will not be used in the optical assembly may be removed prior to molding an optical element on the optical film). The thermoforming of the optical film can be carried out using a female mold or using a male mold. The term "male mold" refers to a mold that is outwardly convex in the region of the mold that is used to form the desired molded part shape (i.e., exclusive of flash). The term "female mold" refers to a mold that is inwardly concave in the region of the mold that is used to form the desired molded part shape (i.e., exclusive of flash). Thermoforming systems utilizing female molds include the AccuForm thermoforming systems available from Hy-Tech Forming Systems (USA), Inc. (Phoenix Ariz.). Thermoforming systems utilizing male molds include the vacuum forming systems from MAAC Machinery Corporation (Carol Stream, Ill.). Utilizing a female mold with high curvature and/or sag (maximum displacement) can result in cracking of conventional hardcoats near the center of the optical film in regions that are intended to be used in the optical assembly. In some aspects of the present description, compositions for the protective coating are provided which result in good scratch resistance and good thermoformability (e.g., thermoformable without cracking). In some embodiments, there is substantially no cracking in the protective coating when thermoforming using a female mold having a high curvature and/or sag (maximum displacement).

FIG. 1A is a schematic cross-sectional view of an optical assembly 100 including an optical element 110 and an optical stack 120. In some embodiments, the optical element 110 is insert molded directly onto the optical stack 120. An optical element can be insert molded onto an optical stack by inserting the optical stack into a mold and them molding the optical element onto the optical stack. The insert molding can be injection insert molding, compression insert molding or some other form of insert molding. It is typically preferable that the material that forms the optical element 110 is molten when it contacts optical stack 120 so that the material forms a suitable bond with the optical stack 120 without including any additional adhesive layers. In some embodiments, the material that forms the optical element 110 and the material that forms an outermost surface of the optical stack 120 are selected to be compatible with each other so that a suitable diffusion bond forms between the optical stack 120 and the optical element 110. For example, in some embodiments, similar polymers, or otherwise compatible (e.g., partially miscible) are used for the material that forms the optical element 110 and the material that forms the outermost surface of the optical stack 120 facing the optical element 110. The similar or compatible polymers may have approximately equal melting points (e.g., within 50° C., or within 30° C., or within 20° C., or within 10° C.), for example. In some embodiments, optical stack 120 includes an optical film including a plurality of alternating polymeric layers and the bonding of the optical film to the optical element 110 is stronger than an interlayer bonding between at least one pair of immediately adjacent layers in the optical film.

In some embodiments, the optical element 110 is a lens. In some embodiments, the lens has refractive optical power in a least one direction. For example, optical element 110 may be a cylindrical lens having optical power in one direction (e.g., x-direction) or a spherical or aspherical lens having optical power in two directions (e.g., x- and y-directions). In some embodiments, other types of optical elements may be used. For example, the optical element may be a prism and the optical stack 120 may be disposed on a face (e.g., a curved or substantially planar hypotenuse) of the prism.

In some embodiments, the optical stack 120 is disposed on a curved major surface of the optical element 110 and in some embodiments, the optical stack 120 is disposed on a substantially planar major surface of optical element 110. The optical stack 120 may be disposed on a curved major surface of the optical element 110 so that at least one location on the first curved major surface of the optical element 110 has a radius of curvature in a range from about 6 mm to about 1000 mm in each of two mutually orthogonal directions (e.g., x- and y-directions). A surface may be described as substantially planar if a best-fit sphere has a radius greater than about 2000 mm.

The optical stack 120 may be or may include an optical film. In some embodiments, the optical film is a mirror film and in some embodiments, the optical film is a reflective polarizer. Examples of reflective polarizers include a multilayer polymer film reflective polarizer and a wire-grid polarizer which may include wires extending generally in a block axis of the reflective polarizer and disposed on a substrate which may be a polymeric substrate. In some embodiments, the optical stack 120 is an integrally formed multilayer optical film comprising a plurality of alternating polymeric layers reflecting or transmitting light primarily by optical interference. In some embodiments, the optical stack 120 includes an integrally formed multilayer optical film and at least one additional layer that is not integral with the multilayer optical film. As used herein, a first element "integrally formed" with a second element means that the first and second elements are manufactured together rather than manufactured separately and then subsequently joined. Integrally formed includes manufacturing a first element followed by manufacturing the second element on the first element. An optical film (e.g., reflective polarizer) including a plurality of layers is integrally formed if the layers are manufactured together (e.g., combined as melt streams and then cast onto a chill roll to form a cast film having each of the layers, and then orienting the cast film) rather than manufactured separately and then subsequently joined. An additional layer not integral with the integrally formed multilayer optical film means that the additional layer is not integrally formed with the multilayer optical film. For example, the additional layer may be formed separately and then subsequently adhered (e.g., laminated using an optically clear adhesive) to the multilayer optical film.

Figure 1B:
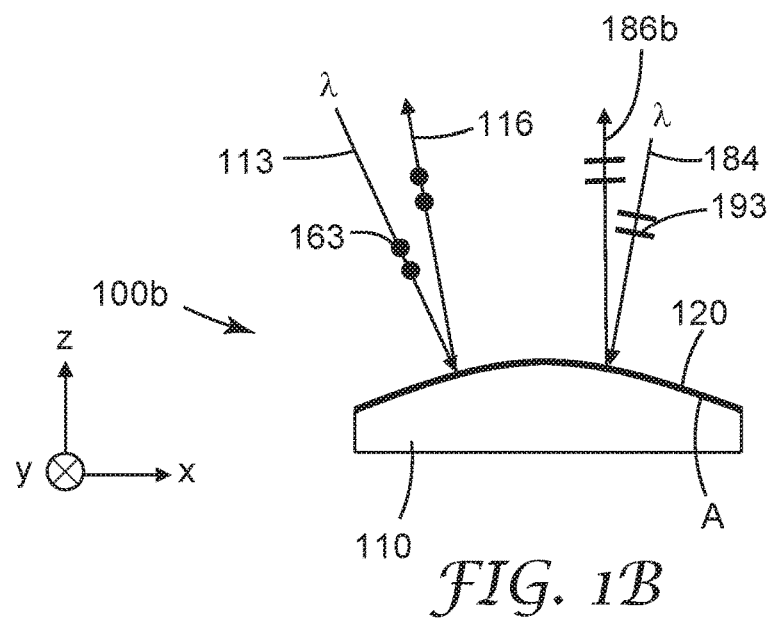

In some embodiments, an optical stack or an optical film included in the optical stack is a mirror film (e.g., visible mirror or infrared mirror) or a reflective polarizer film. Optical stack 120 of FIG. 1A is depicted as a reflective polarizer and optical stack 120*b* of FIG. 1B is depicted as a mirror. In some embodiments, each location over at least about 80%, or at least about 90%, or at least about 95%, or all of a total area of the optical stack 120 or an optical film included in the optical stack 120 has a reflectance greater than about 80%, or greater than about 90%, or greater than about 95% for normally incident light having a same predetermined wavelength and a same first polarization state. The predetermined wavelength may be any or all wavelengths in a predetermined wavelength range. The predetermined wavelength range may be the visible range (400 nm to 700 nm) and/or may include infrared and/or ultraviolet wavelengths. In some embodiments, the predetermined wavelength is about 550 nm.

In some embodiments, each location over at least about 80%, or at least about 90%, or at least about 95%, or all of a total area of the optical stack 120 or an optical film included in the optical stack 120 has a reflectance greater than about 80%, or greater than about 90%, or greater than about 95% for normally incident light having the same predetermined wavelength and a same second polarization state orthogonal to the first polarization state.

A polarization state can be characterized by the direction of the electric field vector which for normally incident light defines an axis tangent to the optical film. If the axis tangent to the optical film or optical stack along the electric field of normally incident light at two different locations on the optical film are in parallel planes that each intersect the optical film along a curve, the polarization states can be considered to be the same. If the axis that is tangent to the optical film or optical stack and that is perpendicular to the electric field of normally incident light at two different locations on the optical film are in parallel planes that each intersect the optical film along a curve, the polarization states can also be considered to be the same. For example, light traveling parallel to the minus z direction and incident on the apex (point with largest z-coordinate) of optical stack 120 may have a first polarization state with the electric field along the y-direction and a second polarization state with the electric field along the x-direction. The first polarization state 163 of light ray 113 is the same as the first polarization state of the light incident at the apex since the electric field vector at the point of incidence is in a plane parallel to the y-z plane in both cases. The second polarization state 193 of light ray 184 is the same as the second polarization state of the light incident at the apex since the electric field vector at the point of incidence is orthogonal to an axis (parallel to y-axis) that is tangent to the optical film and that is in a plane parallel to the y-z plane in both cases.

In some embodiments, the optical stack 120 includes an optical film where the optical film is a reflective polarizer substantially reflecting normally incident light having the predetermined wavelength and a block polarization state and substantially transmitting normally incident light having the predetermined wavelength and an orthogonal pass polarization state. Substantially reflecting can be understood to mean a reflectivity of at least 60% and substantially transmitting can be understood to mean a transmittance of at least 60%. The block polarization state of a reflective polarizer can be described as the polarization state having the lowest transmittance through the reflective polarizer and the pass polarization state is the orthogonal polarization state. The block polarization state at the center of the reflective polarizer may be the first polarization state. The block polarization state may vary (e.g., the block axis may vary by less than about 5 degrees, or less than about 2 degrees in plan view) from the first polarization state away from the center location due to variations induced by thermoforming the optical film into a curved shape, for example.

Light ray 113 having a predetermined wavelength λ is approximately normally incident on optical stack 120 in a first polarization state 163 and reflects from the optical stack 120 as reflected light ray 116. A small non-zero angle of incidence is shown for ease of illustration. In this case, the light ray 116 is schematically illustrated as entirely reflecting (reflectance of 100% and transmittance of 0%) from the optical stack 120, but optical stack 120 may have less than 100% reflectivity and may have some light in the first polarization state 163 transmitted through the optical stack 120. Light ray 184 having the predetermined wavelength λ is approximately normally incident on optical stack 120 in a second polarization state 193 and is transmitted through the optical stack 120 as transmitted light ray 186. In this case, the light ray 184 is schematically illustrated as being entirely transmitted (transmittance 100% and reflectance of 0%) from the optical stack 120, but optical stack 120 may have less than 100% transmittance and may have some light in the second polarization state 193 reflected from the optical stack 120 (e.g., due to Fresnel reflection). The first polarization state 163 may be, or may approximately (e.g., block axis within 2 degrees of axis of first polarization state 163 in plan view) be, a block polarization state of a reflective polarizer in the optical stack 120. The second polarization state 193 may be, or may approximately (e.g., pass axis within 2 degrees of axis of second polarization state in plan view) be, a pass polarization state of a reflective polarizer in the optical stack 120.

In other embodiments, the optical stack 120 includes a mirror film which substantially reflects both the first 163 and second 193 polarization states. This is illustrated in FIG. 1B which shows optical assembly 100b which is similar to optical assembly 100 except that optical stack 120 has been replaced with optical stack 120b. Optical assembly 100b may have the properties described for optical assembly 100 except for the reflection and transmission properties for the second polarization state 193. In the case of FIG. 1B, the light ray 184 is schematically illustrated as entirely reflecting (reflectance of 100% and transmittance of 0%) from the optical stack 120b, but optical stack 120b may have less than 100% reflectivity and may have some light in the second polarization state 193 transmitted through the optical stack 120b. The optical stack 120 and 120b may include an optical film which substantially determines the reflectance and transmittance of the respective optical stack.

The reflectance and/or transmittance may be specified over an area A which is some specified fraction of the total area of the optical stack or the optical film. For example, the area A may be at least about 80% of the total area and may exclude 20 percent of the total area near the perimeter of the optical stack, for example. In some embodiments, the area A is the total area of the optical stack 120 or 120b or the total area of the optical film included in the optical stack.

The optical assembly 100 may further include a second optical element (not illustrated in FIGS. 1A-1B) disposed on the optical stack 120 opposite the optical element 110. For example, the optical element 110 may be a first lens and the second optical element may be a second lens.

Figure 1C:
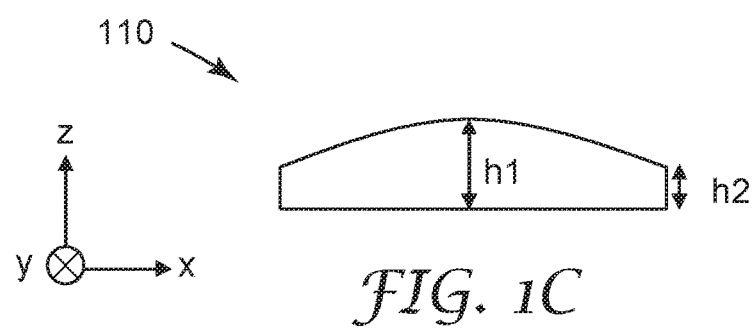
FIG. 1C is a schematic cross-sectional view of an optical element.

FIG. 1C is a schematic cross-sectional view of optical element 110 illustrating a maximum thickness h1 and a minimum thickness h2. The thickness at a location of an optical element can be described as the shortest distance through the location and through opposing major surfaces of the optical element. In some embodiments, optical element 110 is a lens. In some embodiments, the lens has a lens thickness that varies with location by no more than about 50% ((H2−H1))/H1*100% is no more than about 50%), or no more than about 30%, or no more than about 20%, or no more than about 10%. In some embodiments, the lens has a lens thickness that varies with location by at least about 20% ((H2−H1))/H1*100% is at least about 20%), or at least about 30%, or at least about 40%, or at least about 50%, or at least about 60%, or at least about 75%, or at least about 100%, or at least about 150%, or at least about 200%. A lens thickness that varies with location by at least a specified percentage will have at least one first lens location that is at least the specified percentage greater than the lens thickness at least one second lens location. For example, if H2 is at least 1.5 times H1, then the lens thickness varies with location by at least 50% and the thickness H2 at a center location is at least 50% greater than the thickness H1 at an edge location.

Figure 2:
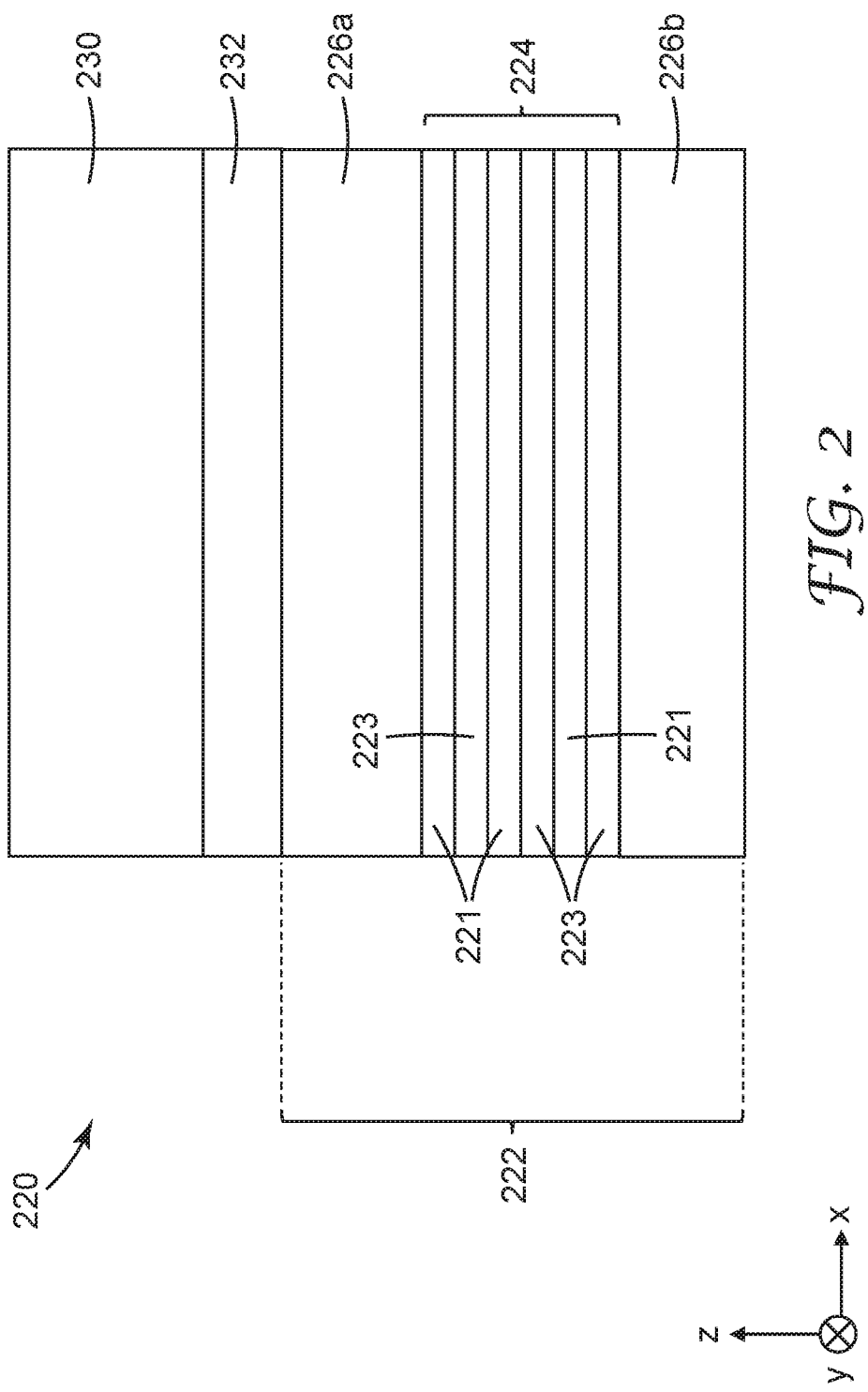
FIG. 2 is a schematic cross-sectional view of an optical stack.

FIG. 2 is a schematic cross-sectional view of an optical stack 220 including an integrally formed multilayer optical film 222, an additional film or layer 230, and a layer 232. In some embodiments, layer 232 is a protective coating applied to the multilayer optical film 222 and additional film or layer 230 is a liner releasably attached to the protective coating. The protective coating may alternatively be considered to be a layer of the multilayer optical film 222. In other embodiments, the layer 232 is an adhesive layer attaching the additional film or layer 232 to the multilayer optical film 222. The optical film 222 includes a plurality of interference layers 224 and noninterference layers 226a and 226b. The plurality of interference layers 224 include alternating first and second polymeric layers 221 and 223.

The plurality of interference layers 224 reflect or transmit light primarily by optical interference. Interference layers can be described as reflecting or transmitting light primarily by optical interference when the reflectance and transmittance of the interference layers can be reasonably described by optical interference or reasonably accurately modeled as resulting from optical interference. Such interference layers are described in U.S. Pat. No. 5,882,774 (Jonza et al.), and U.S. Pat. No. 6,609,795 (Weber et al.), for example, and can be made by coextruding a melt stream having alternating polymeric layers, casting the melt stream to form a cast film, and then orienting (biaxially for mirror films and substantially uniaxially for reflective polarizer films) the cast film to produce birefringent layers (e.g., every other layer in the interference layers can be birefringent, while every other layer remains substantially isotropic) as is known in the art. Adjacent pairs of interference layers having differing refractive indices reflect light when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference. Typically, noninterference layers have a physical thickness of at least 1 micrometer, or at least 3 times a predetermined wavelength, or at least 3 times a largest wavelength in a predetermined range. In some embodiments, more than one noninterference layer is included. In some embodiments, at least one noninterference layer (noninterference layer 226a and 226b in the illustrated embodiment) is integrally formed with the plurality of interference layers 224 and does not reflect or transmit light primarily by optical interference.

In some embodiments, the additional layer 230 is a liner that is releasably bonded to the optical film 222. A liner that is bonded to an optical film but that can be cleanly removed from the optical film without substantially damaging the optical film may be described as releasably bonded to the optical film. In some embodiments, a liner that is releasably bonded to an optical film can be removed from the optical film with no visible damage to the optical film. In some embodiments, when a liner is removable from the optical film without substantial damage to the optical film, for each location over at least 80% of a total area of the optical film, a difference between a reflectance of the optical film at the location before and after the liner is removed is less than about 5% (e.g., absolute value of the difference in reflectance before and after the liner is removed divided by the reflectance after the liner is removed times 100% may be less than 5%), or less than about 2%, or less than about 1%. For example, in some embodiments, the optical film includes a plurality of alternating polymeric layers reflecting or transmitting light primarily by optical interference and each location over at least 80% of a total area of the optical film has a reflectance greater than about 80% for normally incident light having a same predetermined wavelength and a same first polarization state, and the liner is releasably bonded to the optical film such that a difference between the reflectance of the optical film at the location before and after the liner is removed is less than about 5%, or less than about 2%, or less than about 1%. A releasably bonded liner may include a substrate with an adhesive layer that bonds strongly to the substrate but weakly to the optical film. For example, a liner may include a thin layer of low tack adhesive applied to a substrate with a surface treated to increase its bond to the adhesive. Other suitable liners include those that electrostatically bond to the optical film as described in U.S. Pat. No. 6,991,695 (Tait et al.), for example. One example of a suitable liner is OCPET NSA33T available from Sun A Kaken Co, Ltd.

In some embodiments, the optical stack 220 is formed into a curved shape, and then an optical component is insert molded onto the optical stack opposite the additional layer 230. In some embodiments, the additional layer 230 is a liner that is attached to the optical film 222 prior to forming the optical stack 220 into a curve shape and the liner is removable from the resulting optical assembly after the optical element has been insert molded onto the optical stack 220 without substantial damage to the optical film 222.

In some embodiments, the additional layer 230 is optically clear. In some embodiments, the additional layer 230 is a protective coating or layer which may be an optically clear protective coating or layer. A layer (e.g., adhesive layer or a hardcoat layer) may be described as optically clear if it has a haze under transmission of less than 10%. Haze can be determined according to the ASTM D1003-13 test standard. A suitable instrument for measuring haze is the Haze-Gard Plus haze meter (BYK Gardner, Columbia, Md.). In some embodiments, the optical film includes a protective coating having a haze of less than 3%, or less than 2%, or less than 1%.

Figure 3:
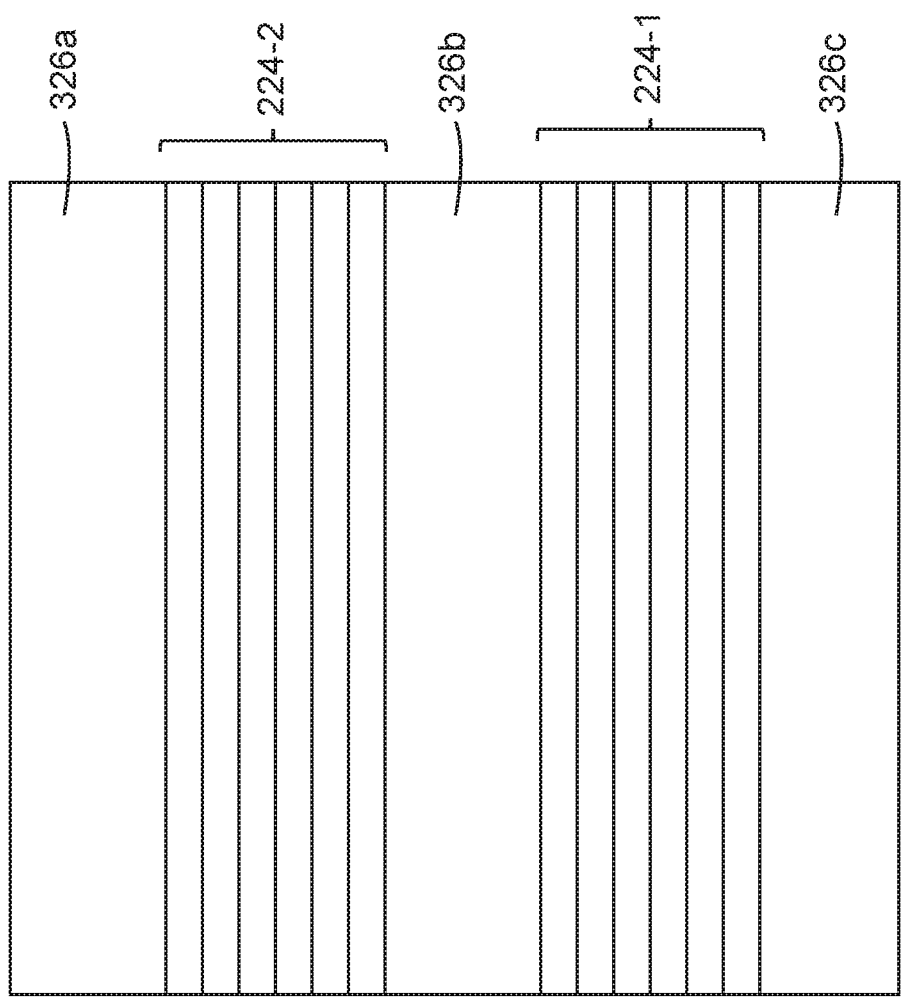
FIG. 3 is a schematic cross-sectional view of an optical film.

FIG. 3 is a schematic illustration of an optical film 322 which can optionally be used in an optical stack (e.g., replacing optical film 222 in optical stack 220). Optical film 322 includes first and second packets 224-1 and 224-2 of interference layers separated by noninterference layer 326b. The optical film 322 further includes outer noninterference layers 326a and 326c. The optical film 322 may be integrally formed. The first and second packets 224-1 and 224-2 may utilize overlapping thickness ranges as described in U.S. Prov. Pat. Appl. 62/467,712 filed Mar. 6, 2017 and titled "High Contrast Optical Film and Devices Including the Same", for example, to provide a reflective polarizer with a high contrast ratio (ratio of pass state transmittance to block state transmittance) or a mirror with a low leakage. In some embodiments, a reflective polarizer utilizing packets with overlapping thickness ranges, for example, has a block state reflectance of at least 99%, or at least 99.5%, or at least 99.8%.

In some embodiments, the optical film 222 or 322 has a reflectance greater than about 80% for normally incident light having a predetermined wavelength and a same first polarization state. In some embodiments, even after an optical film or optical stack (e.g., optical stack 220) is thermoformed into a curved shape and an optical element is molded onto the optical film or stack, the optical film 222 or 322 or other optical films of the present description still has a high reflectivity. For example, in some embodiments, each location over at least about 80%, or at least about 90%, or all of a total area of the optical film has a reflectance greater than about 80%, or greater than about 90% for normally incident light having a same predetermined wavelength and a same first polarization state. The optical film may also have a low leakage even after being formed and having an optical element molded onto the optical film. For example, in some embodiments, each location over at least about 80%, or at least about 90%, or all of a total area of the optical film has a transmittance less than about 5%, or less than about 2%, or less than about 1%, or less than about 0.6%, or less than about 0.5% for normally incident light having the same predetermined wavelength and the same first polarization state. In some embodiments, the optical film is a reflective polarizer substantially reflecting normally incident light having a predetermined wavelength and a block polarization state and substantially transmitting normally incident light having the predetermined wavelength and an orthogonal pass polarization state. In some embodiments, each location over at least about 80%, or at least about 90%, or all of a total area of the reflective polarizer has a transmittance of less than about 5%, or less than about 2%, or less than about 1%, or less than about 0.6%, or less than about 0.5% for normally incident light having the predetermined wavelength and the block polarization state.

Figure 4B:
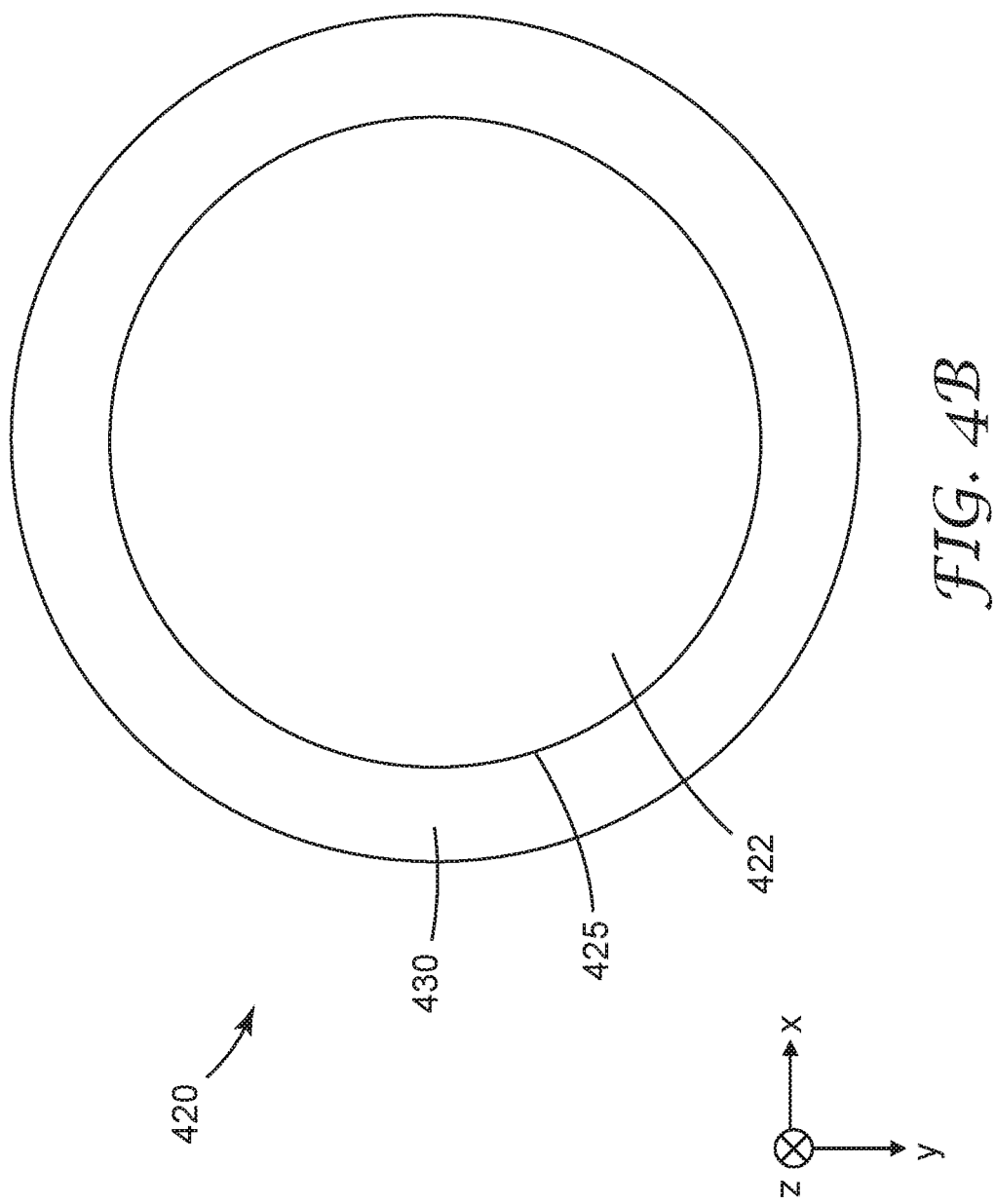
FIG. 4B is a schematic bottom view of the optical stack of FIG. 4A.

In some embodiments, an optical stack includes an optical film and an additional layer which extends beyond a perimeter of the optical film. For example, the additional layer may extend in all directions tangent to the optical film along the perimeter of the optical film. FIGS. 4A-4B are schematic side and bottom views of an optical stack 420 including optical film 422 and additional layer 430. In some embodiments, the optical film 422 is an integrally formed multilayer optical film as described further elsewhere herein (e.g., optical film 422 may correspond to optical film 222 or 322). In some embodiments, the additional layer 430 is a protective layer (e.g., optically clear hardcoat on a substrate) or a liner. In some embodiments, the additional layer 430 is a liner releasably bonded to the optical film 422. Optical film 422 has a perimeter 425 and the additional layer 430 completely covers the optical film 422 and extends beyond the perimeter 425 of the optical film 422. In some embodiments, the interface 428 between the additional layer 430 and the optical film 422 is optically smooth. In other embodiments, the interface 428 is textured. A surface is optically smooth if it is sufficiently smooth that there is substantially no scattering due to surface roughness. For example, if the surface roughness parameter Ra is significantly less than the wavelength of visible light (e.g., less than 50 nm) the optical effect from the surface roughness can be neglected and the surface can be described as optically smooth. A textured surface typically includes textures having a large enough amplitude that the surface is not optically smooth. In some embodiments, a protective coating is disposed on the optical film 422 at the interface 428.

FIG. 4C illustrates an alternate embodiment where the optical stack 420c includes first and second layers 430c and 430b in addition to the optical film 422. First layer 430c extends beyond the perimeter 425 of the optical film 422, but second layer 430b does not. In some embodiments, the second layer 430b is a protective coating (e.g., a hardcoat) and the first layer 430c is a liner.

In some embodiments, an optical stack includes an optical film having an interface between a first major surface of the liner and an outermost major surface of the optical film. The interface may be optically smooth or may be textured. It may be desired for the interface to be optically smooth in some applications (e.g., to provide specular reflection) and textured in others (e.g., to add some degree of diffuse character to otherwise specular reflection). FIG. 4D is a schematic cross-sectional view of optical stack 420d including a liner 430d, an optical film 422d and a textured interface 428d therebetween. Optical films often start with an optically smooth surface, but the surface can become textured in subsequent film processing. The interface may be textured due to a forming process, for example. In some embodiments, the optical film may be formed into a desired shape in a thermoforming process, for example, and a texture from a mold used in the thermoforming process may by imparted to an outer surface of the optical film which is subsequently covered by a liner. The texture in the mold may be designed into the mold or may be an artifact of how the mold was made, for example. In other embodiments, a liner (which may or may not be the same liner used in a subsequent insert molding process) is applied to the optical film prior to thermoforming and any texture from the mold is not imparted to the optical film.

In some embodiments, the layer 430b, or other additional layers described elsewhere herein, is a protective layer (e.g., a layer formed by curing a coating), or a protective film (e.g., a film with a protective coating). For any of the optical assemblies of the present description that includes an optical film disposed on an optical element (e.g., a lens), the optical film may include a protective coating facing away from the optical element (e.g., the protective coating may be disposed at an outermost major surface of the optical film and the opposite major surface of the optical film may contact the optical element) and/or facing a liner in embodiments where a liner is included.

In some embodiments, the protective coating includes an at least partially cured composition, the composition including:

a) 70 to 96 weight percent of urethane (meth)acrylate compound having an average (meth)acrylate functionality of 2 to 9.5, based on the total weight of components a) to d);

b) 2 to 20 weight percent of (meth)acrylate monomer having a (meth)acrylate functionality of 1 to 2, based on the total weight of components a) to d), where the (meth)acrylate monomer does not include a urethane (meth)acrylate compound;

c) optional 0.5 to 2 weight percent of silicone (meth)acrylate, based on the total weight of components a) to d); and d) optional effective amount of photoinitiator;

e) optional inorganic nanoparticles; and f) optional solvent.

Similar protective coatings are described further in U.S. Prov. Pat. App. No. 62/549,082 filed on Dec. 16, 2016, titled "Infrared-Reflecting Optically Transparent Assembly and Method of Making the Same" which is hereby incorporated herein by reference to the extent that it does not contradict the present description. The composition can be coated onto the optical film and then cured prior to forming (e.g., thermoforming) the optical film into the desired shape. The component a) to f) of the composition refer to the composition before it is at least partially cured. In some embodiments, the protective coating has an average thickness of no more than 30 micrometers (e.g., a thickness in a range of 0.5 micrometers to 30 micrometers, or in a range of 1 micrometer to 20 micrometers). The average thickness refers to the thickness averaged (unweighted mean) over the total area of the protective coating.

If solvent is present, the composition, which may be referred to as the curable composition prior to being cured, is optionally (but typically) at least partially dried to provide an at least partially dried curable composition. The curable composition, or the at least partially dried curable composition, is then at least partially cured to provide the shaped abrasion-resistant multilayer optical film. In some embodiments, the at least partially cured composition is fully cured or substantially fully cured.

The prefix "(meth)acryl" refers to methacryl and/or acryl. "Average (meth)acrylate functionality" refers to the average number of (meth)acrylate groups per molecule. "Urethane (meth)acrylate compound" means a compound having at least one (preferably at least 2, 3, 4, or more) carbamate group (i.e., —NHC(=O)O—) and at least one (meth)acryl group. By definition, the total of weight percentages of ingredients in a composition equals 100 weight percent.

The urethane (meth)acrylate compound contributes to the conformability and flexibility of the cured composition, and hence its suitability for thermoforming. Exemplary urethane (meth)acrylate compounds having an average (meth)acrylate functionality of 2 to 9.5 are available from commercial sources, and/or can be prepared according to known methods. In some embodiments, the urethane (meth)acrylate compounds have an average (meth)acrylate functionality of 2 to 9.5, or 2 to 4.8, or 2 to 4.3, 2.3 to 4.3, or 2.5 to 4.1, or 3 to 9.5, or 3 to 9, or 3 to 4.8. The urethane (meth)acrylate compound may be a pure compound or a mixture of pure compounds. In some instances, urethane (meth)acrylate compounds with higher and lower average (meth)acrylate functionalities may be combined to achieve an average (meth)acrylate functionality of 2 to 4.8, or another desired value. The average (meth)acrylate functionality can be chosen to simultaneously give a desired scratch resistance and thermoformability. The desired average (meth)acrylate functionality may depend on the desired shape and use of the thermoformed film. For example, a lower average (meth)acrylate functionality (e.g., 2 to 4.8) may be chosen to give improved thermoformability (e.g., less propensity to crack) when the coated film is thermoformed to larger curvatures (e.g., base 8 or higher) and a higher average (meth)acrylate functionality (e.g., 3 to 9.5) may be chosen to give improved scratch resistance. The molecular weight of the urethane (meth)acrylate compound may also be selected to simultaneously give a desired scratch resistance and thermoformability. In some embodiments, the urethane (meth)acrylate compound has a molecular weight of 1100 g/mole to 2100 g/mole or 1100 g/mole to 1300 g/mole. A lower molecular weight range with a higher acrylate equivalent weight may be chosen to improve thermoformability and a higher molecular weight range with a lower acrylate equivalent weight may be chosen to improve scratch resistance.

Useful, commercially available urethane (meth)acrylate compounds include EBECRYL 264 aliphatic urethane triacrylate, EBECRYL 265 aliphatic urethane triacrylate, EBECRYL 1258 aliphatic urethane triacrylate, EBECRYL 4100 aliphatic urethane triacrylate, EBECRYL 4101 aliphatic urethane triacrylate, EBECRYL 8412 aliphatic urethane acrylate (trifunctional), EBECRYL 4654 aliphatic urethane triacrylate, EBECRYL 4666 aliphatic urethane triacrylate, EBECRYL 4738 aliphatic allophanate urethane triacrylate, EBECRYL 4740 aliphatic allophanate urethane triacrylate, EBECRYL 8405 aliphatic urethane tetraacrylate, EBECRYL 8604 aliphatic urethane tetraacrylate, EBECRYL 4500 aromatic urethane tetraacrylate, EBECRYL 4501 aromatic urethane tetraacrylate, EBECRYL 4200 aliphatic urethane tetraacrylate, EBECRYL 4201 aliphatic urethane tetraacrylate, EBECRYL 8702 aliphatic urethane hexaacrylate, EBECRYL 220 aromatic urethane hexaacrylate, EBECRYL 221 aromatic urethane hexaacrylate, EBECRYL 2221 aromatic urethane hexaacrylate, EBECRYL 2221 aromatic urethane hexaacrylate, EBECRYL 5129 aliphatic urethane hexaacrylate, EBECRYL 1290 aliphatic urethane hexaacrylate, EBECRYL 1291 aliphatic urethane hexaacrylate, EBECRYL 8301-R aliphatic urethane hexaacrylate, EBECRYL 8602 aliphatic urethane acrylate (nonafunctional), all from Allnex, Brussells, Belgium; and CN929 trifunctional urethane acrylate and CN9006 aliphatic urethane acrylate (hexafunctional) from Sartomer Co., Exton, Pa.

In some embodiments, urethane (meth)acrylate compound(s) can be synthesized by reacting a polyisocyanate compound with a hydroxyl-functional (meth)acrylate compound. A variety of polyisocyanates may be utilized in preparing the urethane (meth)acrylate compound. As used herein, the term "polyisocyanate" means any organic compound that has two or more reactive isocyanate (—NCO) groups in a single molecule such as, for example, diisocyanates, triisocyanates, tetraisocyanates, and mixtures thereof. For improved weathering and diminished yellowing, the urethane (meth)acrylate compound(s) employed herein are preferably aliphatic and therefore derived from an aliphatic polyisocyanate.

In some preferred embodiments, the urethane (meth)acrylate compound is preferably a reaction product of hexamethylene diisocyanate (HDI), such as available from Covestro LLC, Pittsburgh, Pa. as DESMODUR H, or a derivative thereof. These derivatives include, for example, polyisocyanates containing biuret groups, such as the biuret adduct of hexamethylene diisocyanate (HDI) available from Covestro LLC as DESMODUR N-100, polyisocyanates containing one or more isocyanurate rings

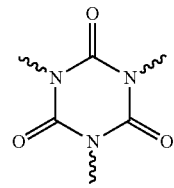

such as that available from Covestro LLC as DESMODUR N-3300, as well as polyisocyanates containing urethane groups, uretdione groups, carbodiimide groups, and/or allophanate groups. Yet another useful derivative, is a hexamethylene diisocyanate (HDI) trimer, available from Covestro LLC as DESMODUR N-3800. These derivatives are preferred as they are polymeric, exhibit very low vapor pressures and are substantially free of isocyanate monomer.

In some embodiments, urethane (meth)acrylate compound(s) is/are the reaction product(s) of a polyisocyanate such as a hexamethylene diisocyanate (HDI) derivative having an —NCO (i.e., isocyanate group) content of at least 10 percent, at least 15 percent, or even at least 20 weight percent. In some cases, HDI or other polyisocyanate may be reacted with hydroxyl-functional (meth)acrylate compounds and polyols. The —NCO content of the polyisocyanate is preferably not greater than 50 weight percent. On some embodiments, the polyisocyanate typically has an equivalent weight of at least 80, 100, 120, 140, 160, 180, or even 200 grams/per —NCO group. The equivalent weight is typically no greater than 500, 450, or 400 grams/per —NCO group and in some embodiments no greater than 350, 300, or 250 grams/per —NCO group, although this is not a requirement.

When aliphatic polyisocyanates comprising a cyclic group such as an isophorone diisocyanate (IPDI) derivative are used, the resulting cured composition can be less flexible (e.g., have poor thermoformability) and poor abrasion resistance.

The polyisocyanate is reacted with a hydroxyl-functional acrylate compound having the formula $HOQ(A)_p$; wherein Q is a divalent organic linking group, A is a (meth)acryl functional group —XC(=O)C($R_2$)=$CH_2$ wherein X is O, S, or NR wherein R is H or $C_1$-$C_4$ alkyl, $R_2$ is a lower alkyl of 1 to 4 carbon atoms or H; and p is 1 to 6. The —OH group reacts with the isocyanate group forming a urethane linkage.

In some embodiments, the polyisocyanate can be reacted with a diol acrylate, such as a compound of the formula $HOQ(A)Q_1Q(A)OH$, wherein $Q_1$ is a divalent linking group and A is a (meth)acryl functional group as previously described. Representative compounds include hydantoin hexaacrylate (HHA) (e.g., see Example 1 of U.S. Pat. No. 4,262,072 (Wendling et al.), and $H_2C$=$C(CH_3)C$(=O)$OCH_2CH(OH)CH_2O(CH_2)_4O$ $CH_2CH(OH)CH_2OC$(=O)$C(CH_3)$=$CH_2$.

Q and $Q_1$ are independently a straight or branched chain or cycle-containing connecting group. Q can, for example, include a covalent bond, alkylene, arylene, aralkylene, or alkarylene. Q can optionally include heteroatoms such as O, N, and S, and combinations thereof. Q can also optionally include a heteroatom-containing functional group such as carbonyl or sulfonyl, and combinations thereof. In one embodiment, the hydroxyl-functional acrylate compounds used to prepare the urethane (meth)acrylate compound are monofunctional, such as in the case of hydroxyethyl acrylate, hydroxypropyl acrylate, hydroxybutyl acrylate, and caprolactone monoacrylate, available as SR-495 from Sartomer Co. In this embodiment, p is 1.

In another embodiment, the hydroxyl-functional acrylate compounds used to prepare the urethane (meth)acrylate compound are multifunctional, such as the in the case of glycerol dimethacrylate, 1-(acryloxy)-3-(methacryloxy)-2-propanol, and pentaerythritol triacrylate. In this embodiment, p is at least 2, at least 3, at least 4, at least 5, or at least 6.

In some embodiments, only monofunctional hydroxyl-functional acrylate compounds are utilized in the preparation of the urethane (meth)acrylate compound. In other embodiments, a combination of monofunctional and multifunctional hydroxyl-functional acrylate compounds are utilized in the preparation of the urethane (meth)acrylate compound. In some embodiments, the weight ratio of monofunctional hydroxyl-functional acrylate compound(s) to multifunctional hydroxyl-functional acrylate compound(s) ranges from 0.5:1 to 1:0.5. When the urethane (meth)acrylate compound is prepared from only multifunctional hydroxyl-functional acrylate compound(s), in some embodiments the resulting cured composition can be less flexible.

In some embodiments, the urethane (meth)acrylate compound comprises a reaction product of a biuret adduct of hexamethylene diisocyanate (HDI) or a isocyanurate adduct of HDI with a monofunctional hydroxyl-functional acrylate such as hydroxyethyl acrylate, hydroxypropyl acrylate, hydroxybutyl acrylate, or caprolactone monoacrylate and mixtures thereof.

In some embodiments, the urethane (meth)acrylate compound comprises a reaction product of a biuret adduct of hexamethylene diisocyanate (HDI) or a isocyanurate adduct of HDI with difunctional hydroxyl-functional acrylate such as glycerol dimethacrylate, 1-(acryloxy)-3-(methacryloxy)-2-propanol and mixtures thereof.

In some embodiments, the urethane (meth)acrylate compound comprises a reaction product of a biuret adduct of hexamethylene diisocyanate (HDI) or a isocyanurate adduct of HDI with at least one monofunctional hydroxyl-functional acrylate independently selected from hydroxyethyl acrylate, hydroxypropyl acrylate, hydroxybutyl acrylate, or caprolactone monoacrylate, and optionally at least one multifunctional hydroxyl-functional acrylate independently selected from glycerol dimethacrylate, 1-(acryloxy)-3-(methacryloxy)-2-propanol, or pentaerythritol triacrylate.

In some embodiments, the urethane (meth)acrylate compound comprises a reaction product of a biuret adduct of hexamethylene diisocyanate (HDI) or a isocyanurate adduct of HDI with at least one monofunctional hydroxyl-functional acrylate independently selected from hydroxyethyl acrylate, hydroxypropyl acrylate, hydroxybutyl acrylate, or caprolactone monoacrylate and optionally at least one multifunctional hydroxyl-functional acrylate independently selected from glycerol dimethacrylate, 1-(acryloxy)-3-(methacryloxy)-2-propanol, or pentaerythritol triacrylate, where the biuret adduct of hexamethylene diisocyanate (HDI) or the isocyanurate adduct of HDI with at least one monofunctional hydroxyl-functional acrylate has an average (meth)acrylate functionality of 3.5 to 9.5.

In some embodiments, the urethane (meth)acrylate compound comprises a reaction product of a biuret adduct of hexamethylene diisocyanate (HDI) or a isocyanurate adduct of HDI with at least one monofunctional hydroxyl-functional acrylate independently selected from hydroxyethyl acrylate, hydroxypropyl acrylate, hydroxybutyl acrylate, or caprolactone monoacrylate, and optionally at least one multifunctional hydroxyl-functional acrylate independently selected from glycerol dimethacrylate, 1-(acryloxy)-3-(methacryloxy)-2-propanol, or pentaerythritol triacrylate, where the biuret adduct of hexamethylene diisocyanate (HDI) or the isocyanurate adduct of HDI with at least one monofunctional hydroxyl-functional acrylate has an average (meth)acrylate functionality of 3.5 to 9.5, and has a molecular weight of 1100 g/mole to 2100 g/mole.

In some embodiments, the urethane (meth)acrylate compound comprises a reaction product of a biuret adduct of hexamethylene diisocyanate (HDI) or a isocyanurate adduct of HDI with at least one monofunctional hydroxyl-functional acrylate independently selected from hydroxyethyl acrylate, hydroxypropyl acrylate, hydroxybutyl acrylate, or caprolactone monoacrylate, and optionally at least one multifunctional hydroxyl-functional acrylate independently selected from glycerol dimethacrylate, 1-(acryloxy)-3-(methacryloxy)-2-propanol, or pentaerythritol triacrylate, where the biuret adduct of hexamethylene diisocyanate (HDI) or the isocyanurate adduct of HDI with at least one monofunctional hydroxyl-functional acrylate has an average (meth)acrylate functionality of 3.5 to 9.5, has a molecular weight of 1100 g/mole to 2100 g/mole, and has an acrylate equivalent weight of 307 g/equivalent to 220 g/equivalent.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 9.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 9, and has a molecular weight of 1100 g/mole to 2100 g/mole.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 9, has a molecular weight of 1100 g/mole to 2100 g/mole and has an acrylate equivalent weight of 307 g/equivalent to 220 g/equivalent.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 4.8.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 4.8, and has a molecular weight of 1100 g/mole to 1300 g/mole.

In some embodiments, the urethane (meth)acrylate compound comprises a reaction product of a biuret adduct of hexamethylene diisocyanate (HDI) or a isocyanurate adduct of HDI with hydroxyethyl acrylate or a combination of hydroxyethyl acrylate and pentaerythritol triacrylate, that has an average (meth)acrylate functionality of 3.5 to 4.8, has a molecular weight of 1100 g/mole to 1300 g/mole, and has an acrylate equivalent weight of 307 g/equivalent to 275 g/equivalent.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst if any, will be apparent to those of skill in the art. Further examples can be found in the Examples section hereinbelow.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as crosslinking agents, for example. Examples of useful (meth) acrylates include mono(meth)acrylates such as octyl (meth) acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth) acrylate, methyl (meth)acrylate, hexyl (meth)acrylate, (meth)acrylic acid, stearyl (meth)acrylate, hydroxy functional caprolactone ester (meth)acrylate, isooctyl (meth) acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred in some embodiments. (Meth)acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, N.J.

The curable composition may optionally, but preferably, further includes an effective amount of photoinitiator. By the term "effective amount" is meant an amount that is at least sufficient amount to cause curing of the curable composition under ambient conditions. Typically, effective amounts of photoinitiator include less than 10 percent by weight, more typically less than 7 percent by weight, and more typically less than 3 percent by weight of the total curable composition. It will be recognized that curing may be complete even though polymerizable (meth)acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); titanium complexes such as bis(η5-2,4-cyclopentadien-1-yl)bis[2,6-difluoro-3-(1H-pyrrol-1-yl)phenyl] titanium (available as CGI 784 DC from Ciba Specialty Chemicals); and mono- and bis-acylphosphines (available from Ciba Specialty Chemicals as IRGACURE 1700, IRGACURE 1800, IRGACURE 1850, and DAROCUR 4265). One useful photoinitiator, a difunctional alpha hydroxyketone, is available as ESACURE ONE from Lamberti S.p.A, Albizzate, Italy.

Desirably, if an acylphosphine or acylphosphine oxide photoinitiator is utilized, it is combined with a photoinitiator (e.g., 2-hydroxy-2-methyl-1-phenyl-1-propanone) having a high extinction coefficient at one or more wavelengths of the actinic radiation. Such combination typically facilitates surface cure while maintaining low levels of costly photoinitiator.

Other useful photoinitiators include: anthraquinones (e.g., anthraquinone, 2-ethylanthraquinone, 1-chloroanthraquinone, 1,4-dimethylanthraquinone, 1-methoxyanthraquinone) and benzophenone and its derivatives (e.g., phenoxybenzophenone, phenylbenzophenone).

The curable composition may contain optional solvent, generally organic solvent, although water/solvent blends may be used. Exemplary optional solvents include hydrocarbons or halogenated hydrocarbons (e.g., toluene, cyclohexane, petroleum ether, lower alcohols (e.g., methanol, ethanol, propanol, and isopropanol), esters of aliphatic acids (e.g., ethyl acetate), ethers (e.g., tetrahydrofuran), and ketones (e.g., acetone and methyl ethyl ketone). The solvents can be used singly or in admixture. One skilled in the art can readily determine which solvent to use, and its amount.

The curable composition may also contain one or more optional additives such as, for example, fillers, thickeners, tougheners, pigments, fibers, tackifiers, lubricants, wetting agents, surfactants, antifoaming agents, dyes, coupling agents, plasticizers, and suspending agents.

In some embodiments, the curable composition further includes nanoparticles such as alpha alumina nanoparticles, preferably in an amount of 0.2 to 9 percent by weight (more preferably 0.2 to 3 percent by weight), based on the total weight of the curable composition.

Preferably, the alpha alumina nanoparticles have a particle size distribution with a Dv50 (median particle size by volume) of from 0.05 to 1 micrometer. In some preferred embodiments, the alpha alumina nanoparticles have a particle size distribution with a Dv50 of 0.05 to 0.3 micrometers, or 0.05 to 0.2 micrometers, or 0.06 to 0.15 micrometers. In some embodiments, the alpha alumina nanoparticles have a polymodal distribution.

The alpha alumina nanoparticles include, or preferably consist essentially of (e.g., are at least 99 weight percent), or even consist of, alumina in its alpha crystalline form.

The alpha alumina nanoparticles can be made by milling larger size alpha alumina, for example, using a ball mill or a jet mill. If using a ball mill the milling media preferably includes, or even consists of, alpha alumina, although other milling media such as, for example, aluminum zirconate media may be used.

Alpha alumina nanoparticles, which may be in the size range of having a particle size distribution with a Dv50 of from 0.05 to 1 micrometer, can be readily obtained from commercial sources. Suppliers include US Research Nanomaterials, Inc., Houston, Tex.; Sisco Research Laboratories Pvt. Ltd., Mumbai, India; and Baikowski International Corp., Charlotte, N.C.

The curable composition may be coated onto a major surface of the optical film by any suitable technique including, for example, spray coating, roll coating, gravure coating, slot coating, knife coating, bar coating, and dip coating. If optional solvent is present, it is typically at least partially dried by evaporation of some, or all, of the solvent (e.g., using a forced air oven or other heating means).

Next, the optionally at least partially dried, curable composition is at least partially cured, preferably fully cured to provide the abrasion-resistant optical film. Curing may be accomplished using heat if the curable composition includes a thermal initiator (e.g., a peroxide initiator), particulate radiation (e.g., e-beam), or photocuring (e.g., using ultraviolet and/or visible wavelengths of electromagnetic radiation). Techniques for such curing technologies are well-known in the art and are within the capability of the skilled artisan.

Once the abrasion-resistant optical film is prepared it is shaped by thermoforming to create a shaped abrasion-resistant multilayer optical film. The thermoforming can be carried out using a female mold or using a male mold. In some aspects of the present description, compositions for the protective layer are provided which result in substantially no cracking in the protective layer when thermoforming using a female mold having a relatively high curvature and/or sag (maximum displacement). For example, in some embodiments, the composition includes 80 to 96 weight percent of urethane (meth)acrylate compound and 2 to 12.5 weight percent of (meth)acrylate monomer, where the average (meth)acrylate functionality of the urethane (meth)acrylate compound is from 2 to 4.8, and the protective coating has a best-fit spherical radius of curvature of 58 mm to 76 mm and a maximum displacement (sag) from a plane tangent to the protective coating at a center of the protective coating of 13 to 20 mm. In some such embodiments, or in other embodiments, the urethane (meth)acrylate compound has a molecular weight in a range of 1100 g/mole to 1300 g/mole.

It is often advantageous in thermoforming to pre-stretch the heated sheet immediately prior to forming it in the mold. There are two principal reasons for this. First, particularly when simple vacuum forming is combined with solid phase forming, the available force may be insufficient to stretch and form the sheet efficiently. A second reason is that some shapes, for example cup or box forms of relatively high aspect ratio, give rise to excessive variations in wall thickness when formed without pre-stretch. This arises because the sheet touches down first on the edges and side walls of the mold cavity and then perhaps in the center of the base. The combined mechanisms of chilling and friction tend to anchor the sheet in these positions so that all the remaining deformation needed to complete the forming is contributed by a minor proportion of the sheet area. In this case, the remedy may be selective pre-stretching in a manner related to the geometry of the mold form.

Selective pre-stretching is achieved by means of specially shaped plugs which are mechanically advanced into the heated sheet to produce local stretching in a way calculated to counteract the thinning tendency imposed by the mold geometry. The technique is generally referred to as plug assist. The plug shape exerts a considerable influence on wall thickness variation. Plug design is as much an art as a science. A blunt-nosed plug tends to produce articles with a thick base and thinner sidewalls. Tapered can-like plugs, on the other hand, produce a forming with thicker and stronger corners. Plug design must be optimized for each individual application but the general rule is for smooth surfaces and blended shapes without sharp transitions in form. The coefficient of friction for heated polypropylene sheet is relatively high, so plugs should be made from low-friction materials. The usual choices are polyamide, PTFE, or filled epoxy resins.

When the sheet pre-stretch is to be generalized over the whole sheet rather than localized in the area of individual mold features, the effect is achieved either by partial vacuum or positive air pressure. In both cases, a low-pressure differential and a controlled flow rate is employed to inflate the sheet without causing excessive thinning or rupture. Pre-stretch by positive air pressure is often referred to as billow. The air pressure is sometimes generated by the piston effect, produced by advancing a mold towards the sheet. This pre-stretch technique is generally known as air slip. Some processes combine plug and billow pre-stretch techniques.

Hardcoats on thermoplastic films (e.g., multilayer optical films) may be assessed for their thermoformability by thermoforming them with a female mold having, for example, an 8 base lens shape (a spherical radius of curvature 66.25 millimeters and a maximum depth (sag) of 18.5 millimeters) and determining the amount of cracking of the hardcoat from the center of the lens shape to the edges of the lens shape. Preferred embodiments exhibit no cracking anywhere on the lens shape. If the coating on the lens shape cracks, the crack usually starts at the center when a female mold is used. For example, if a crack starts at the center and continues 20% of the distance between the center and the edge of the lens shape, then cracking is reported in the Examples as 20% from the center. Once a lens shape is thermoformed, generally there is no further cracking when this lens shape is used in further molding operations.

Figure 5A:
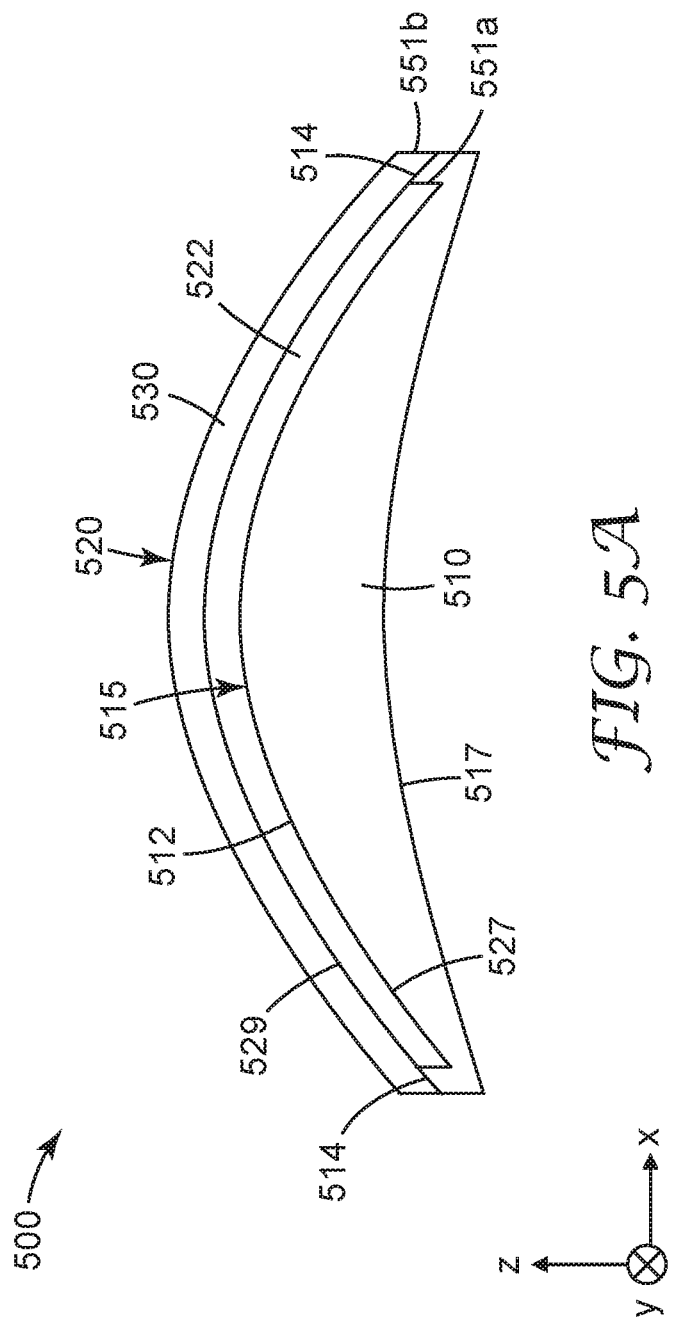
FIGS. 5A-5B are schematic cross-sectional views of optical assemblies.

FIG. 5A is a schematic cross-sectional view of optical assembly 500 including a lens having opposing first and second major surfaces 515 and 517 and an optical stack 520 disposed on the lens 510. The first major surface 515 includes a first portion 512 and a second portion 514. The optical stack includes an optical film 522 and an optional additional film or layer 530. The additional layer 530 may also be referred to as a first layer. More than one additional layer 530 may be included. For example, the additional layers may include a first layer disposed on the optical film 522 and a second layer disposed on the first layer opposite the lens 510 (e.g., the first layer may be a hardcoat and the second layer may be a liner). The optical film 522, which may be a multilayer optical film as described further elsewhere herein, has first and second major surfaces 527 and 529. The first major surface 527 of the optical film 522 is disposed on the first portion 512 of the first major surface 515 of the lens 510. The optical film 522 is disposed between the lens 510 and the additional layer 530, which may be a liner or a protective layer, for example. In some embodiments, the optical film 522 is an integrally formed multilayer optical film and the additional layer 530 is not integral with the optical film 522. In some embodiments, the optical film 522 includes a protective coating (e.g., corresponding to layer 430b) on the major surface 529 and the additional layer 530 is a release liner.

The second major surface 529 is substantially flush with the second portion 514 of the first major surface 515. A major surface of a film or layer may be described as substantially flush with another surface (or the other surface substantially flush with the major surface of the film or layer) if a separation between the major surface and the other surface is no more than about 30% of the thickness of the film or layer. In some embodiments, the separation between the major surface of the film or layer and the other surface is no more than 20%, or no more than 10% of the thickness of the film or layer.

The second portion 514 of the first major surface 515 may extend vertically from the first portion 512 of the first major surface 515 as schematically illustrated in FIG. 5A, of the second portion 514 may extend at some angle from the first portion 512. The precise angle may be determined by the shape of the edge of the optical film 522 when the lens is insert molded onto the optical stack 520. The shape of the edge may depend on how the optical film 522 was cut out from a larger film (e.g., a roll of the optical film).

Figure 5B:
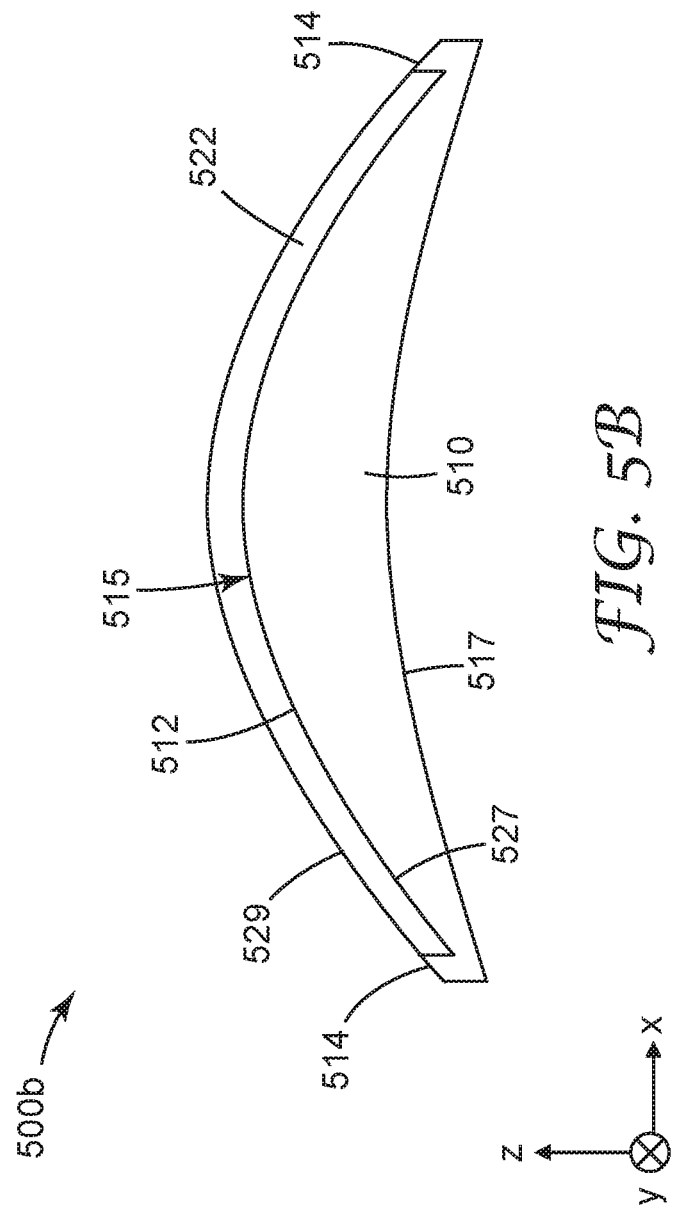

In some embodiments, the additional layer 530 is not included. In some embodiments, the optical assembly 500 is formed with the additional layer 530 being a liner that is subsequently removed. FIG. 5B is a schematic illustration of optical assembly 500b which can be formed, for example, by removing the additional layer 530 from the optical assembly 500.

Figure 5C:
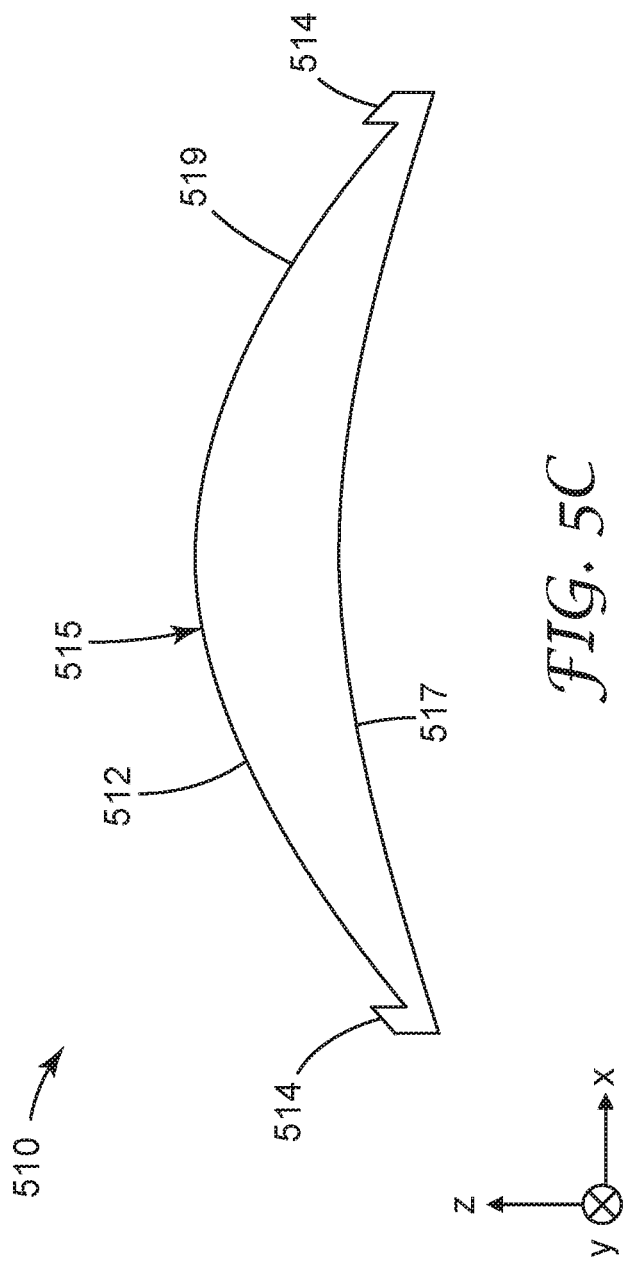
FIG. 5C is a schematic cross-sectional view of a lens.
Figure 5D:
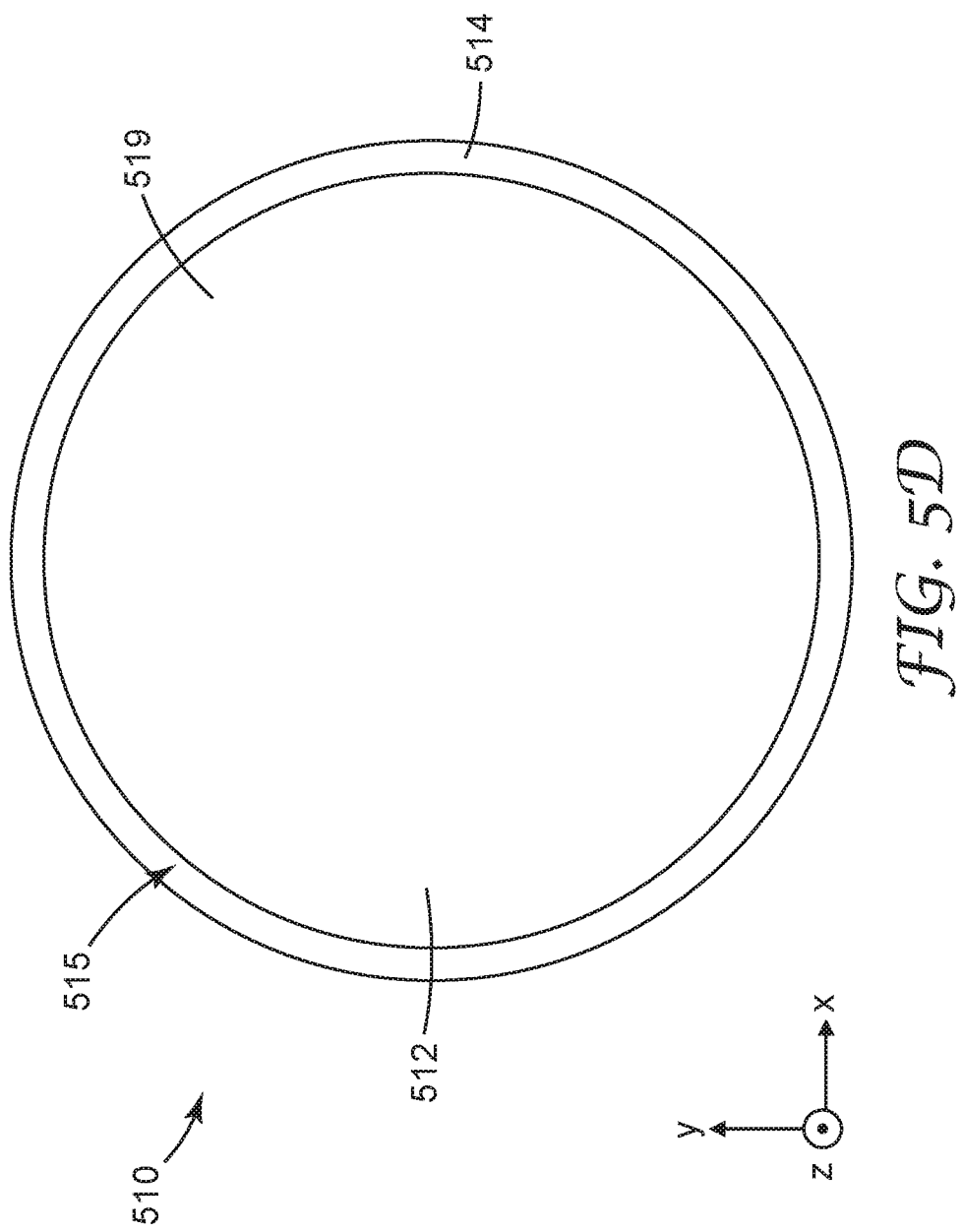
FIG. 5D is a schematic top view of the lens of FIG. 5C.

FIG. 5C is a schematic cross-sectional view of lens 510 without optical film(s) disposed on the first major surface 515 and FIG. 5D is a schematic top view of the lens 510. The first major surface 515 may be described as defining a curved recess 519. In the illustrated embodiment, the curved recess 519 extends over the first portion 512 of the first major surface 515 and is bounded by the second portion 514 of the first major surface 515.

In the embodiment illustrated in FIG. 5A, the lens 510 may be described as at least partially wrapping around an edge of the optical stack 520. The edge of the optical stack 520 includes an edge 551a of the optical film 522 and an edge 551b of the additional layer 530. In the illustrated embodiment, the lens 510 at least partially wraps around the edge 551a of the optical film 522 portion of the optical stack 520 to be flush with the optical film 522. Other optical elements, such as a prism, for example, may be molded onto an optical film and may at least partially wraps around the edge of the optical film and to optionally be flush with the optical film.

Figure 6A:
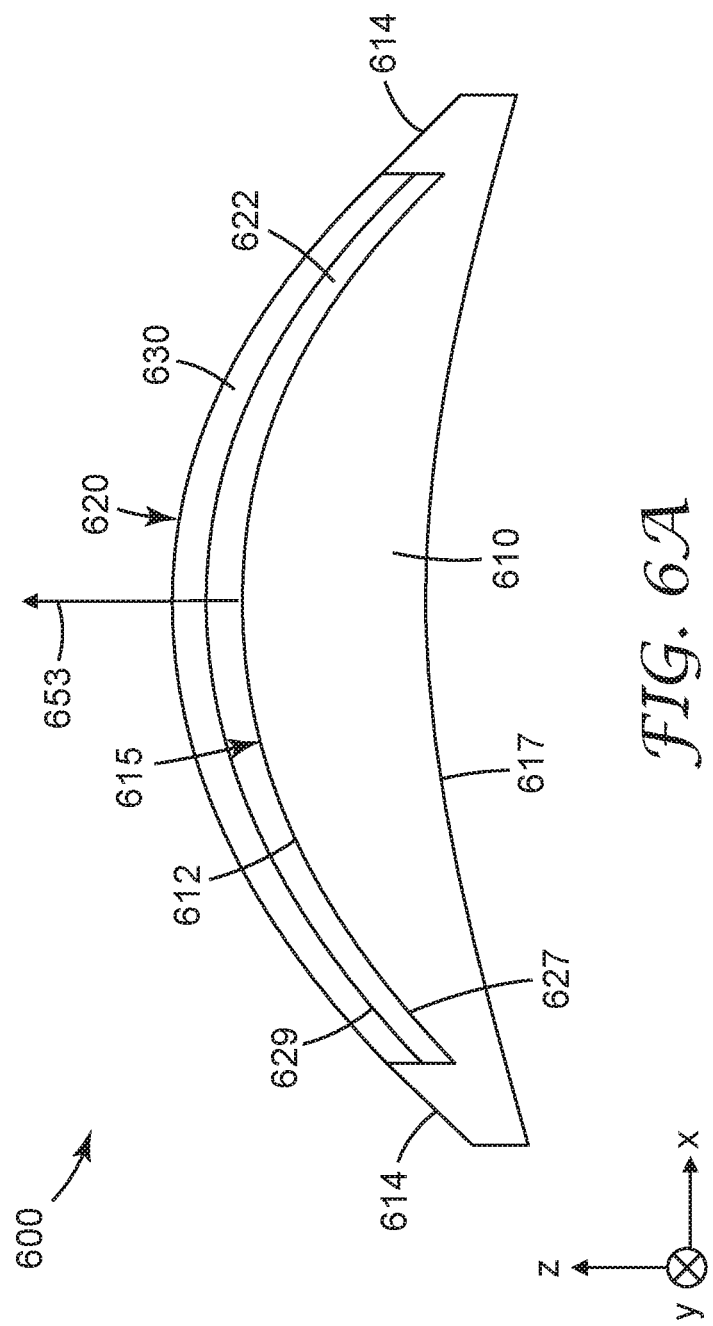
FIGS. 6A-6B are schematic cross-sectional views of optical assemblies.

In other embodiments, the lens may also at least partially wrap around the edge of the additional layer. FIG. 6A is a schematic cross-sectional view of an optical assembly 600 which includes an optical stack 620 disposed on a first portion 612 of a first major surface 615 of a lens 610. The lens 610 has a second major surface 617 opposite the first major surface 615. The optical stack 620 includes a multilayer optical film 622 and an additional layer or film 630 disposed on the multilayer optical film 622. The lens 610 at least partially wraps around an edge of the optical stack 620. In the illustrated embodiment, the lens 610 warps around an edge of the optical film 622 and at least partially wraps around an edge of the additional film 630. In some embodiments, the lens 610 at least partially wraps around an edge of the additional film 630 to be flush with the additional film 630. For example, an outermost major surface of the additional film 630 opposite the first portion 612 may be flush with the second portion 614 of the first major surface 615.

The multilayer optical film 622 includes a first major surface 627 disposed on the first portion 612 and includes an opposite second major surface 629. In some embodiments, the lens fully wraps around an edge of the multilayer optical film 622 and extends past the second major surface 629 of the multilayer optical film 622 in a direction parallel to a normal 653 to the lens 610 at a center of the first major surface 615 the lens 610.

Figure 6B:
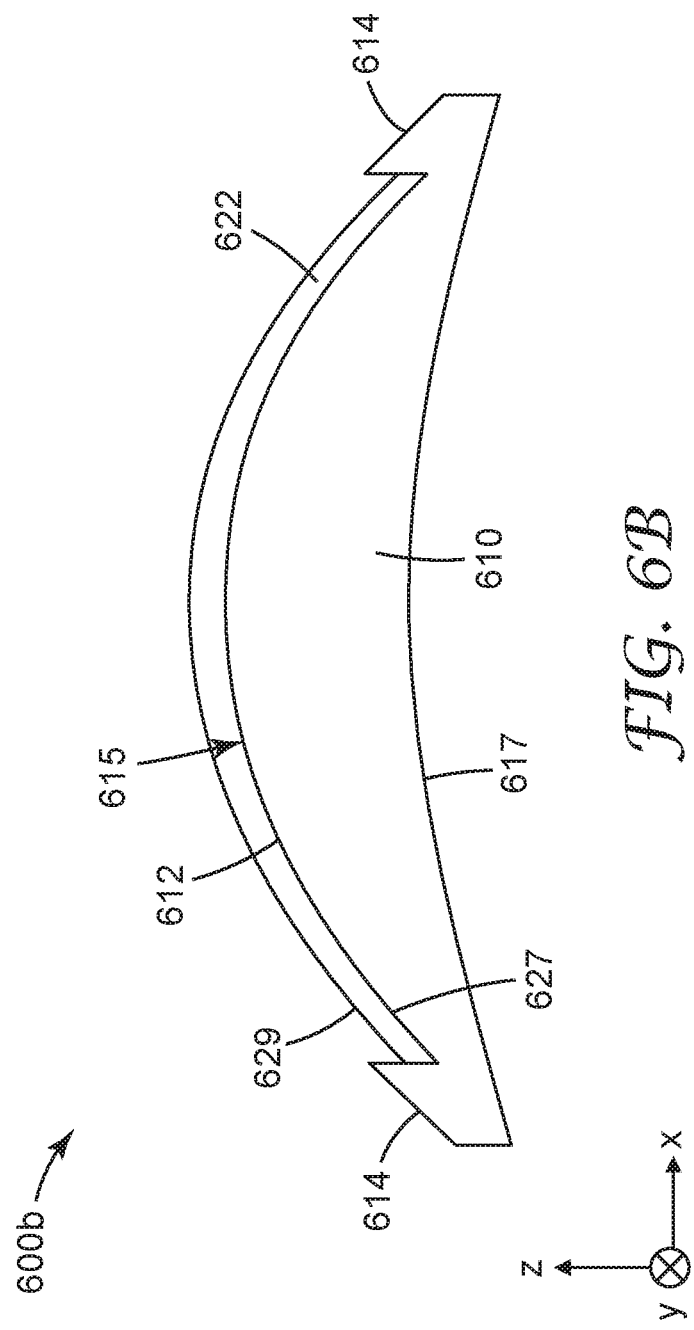

In some embodiments, the additional film 630 is a protective film (e.g., a hardcoat) and may be applied to the multilayer optical film 622 as a coating of a curable composition which is subsequently at least partially cured. In some embodiments, the additional film 630 is a releasably attached liner and a protective coating (e.g., corresponding to layer 430b) is included in the multilayer optical film 622 at the major surface 629. FIG. 6B is a schematic cross-sectional view of an optical assembly 600b which corresponds to optical assembly 600 except that the additional layer 630 has been removed.

In some embodiments, the lens has a first major surface defining a curved recess therein and a multilayer optical film is adhered to and conforms to the curved recess. For example, any of the embodiments illustrated in FIGS. 5A-5B and 6A-6B can be described as having an optical film conforming to a curved recess defined by the first major surface. An optical film can be adhered to the curved recess by being diffusion bonded to the lens via diffusion bonding, for example, as described further elsewhere herein. Alternatively, the lens can be formed separately and the optical film bonded to the curved recess with an optically clear adhesive, for example.

In some embodiments, an optical film disposed on an optical element is convex toward the optical element. In some embodiments, an optical film disposed on an optical element is concave toward the optical element. In some embodiments, an optical film is adhered to and conforms to a convex surface (e.g., a convex surface of a curved recess). In some embodiments, an optical film is adhered to and conforms to a concave surface (e.g., a concave surface of a curved recess). In some embodiments, an optical film is adhered to and conforms to a planar surface.

Figure 7A:
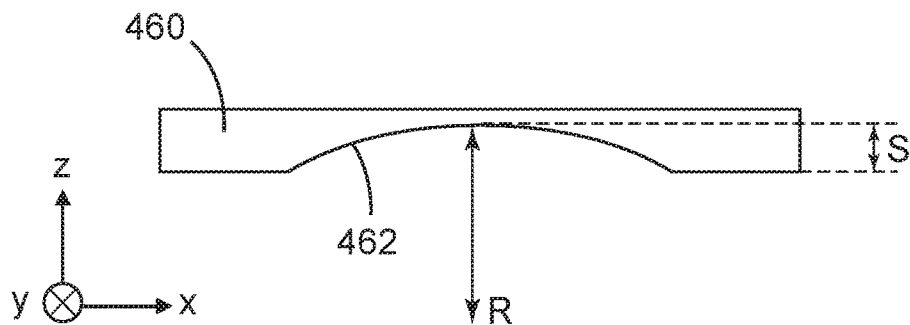
FIGS. 7A-7E illustrate processes for injection insert molding an optical element onto an optical film.
Figure 7B:
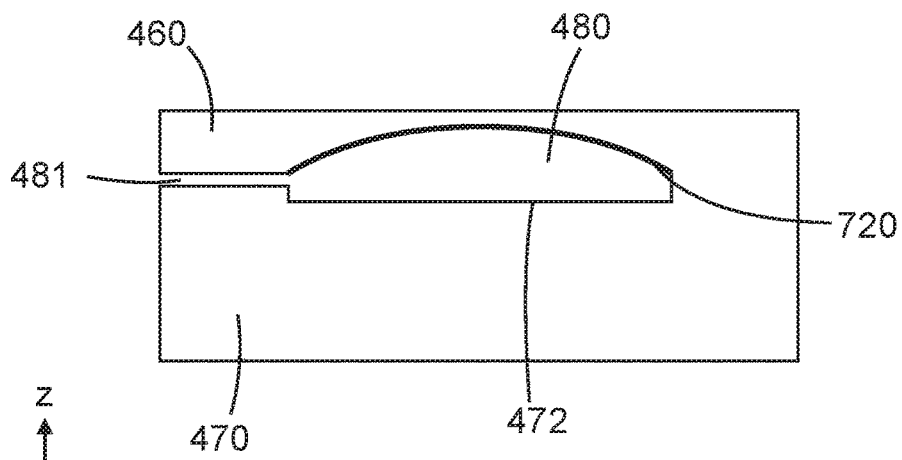
Figure 7C:
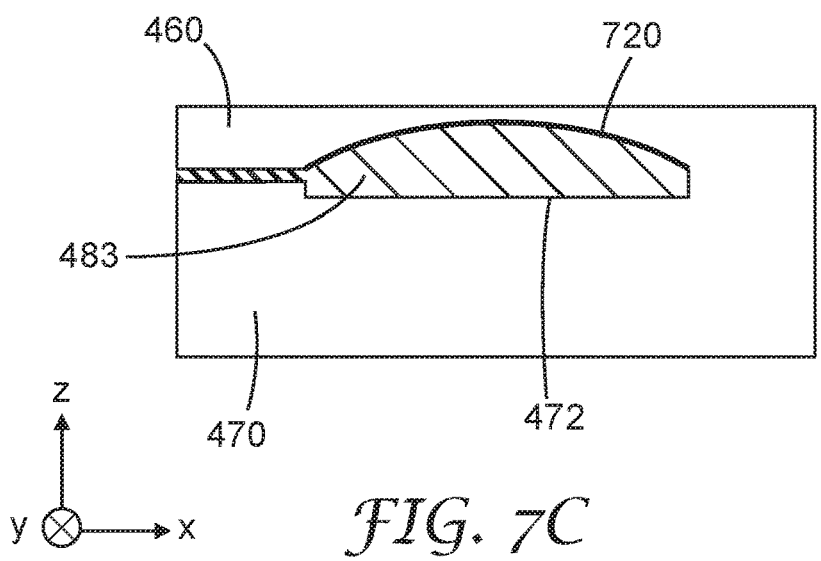

FIGS. 7A-7C schematically illustrate a method of fabricating an optical assembly. The method includes providing a first mold 460 having a first curved mold surface 462 (FIG. 7A), and placing a shaped optical film or optical stack 720 on the first curved mold surface 462 (FIGS. 7B-7C). The optical stack is preferably shaped (e.g., via thermoforming) into a desired shape which substantially matches that of the first curved mold surface 462. Thermoforming of a film or optical stack can be carried out by heating the film or optical stack, contacting the optical stack with a curved mold while stretching the optical stack as generally described by U.S. Pat. No. 9,557,568 (Ouderkirk et al.) and 6,788,463 (Merrill et al.), for example. Next, a second mold 470 is disposed such that a second mold surface 472 of the second mold 470 is spaced apart from and aligned with the first curved mold surface 462. The second mold surface 472 may be curved or substantially planar as illustrated. The first and second mold surfaces 462 and 472 define a mold cavity 480 therebetween (FIG. 7B). Next, the mold cavity 480 is filled or substantially filled with a flowable material 483 (FIG. 7C) which is then solidified to form a solid optical element bonded to the optical stack 720 (see, e.g., optical element 110 optical assembly 100). The flowable material 483 may be introduced into the mold cavity 480 via gate 481. The first and second molds 460 and 470 may be removed and any excess material (e.g., runner material from gate 481) removed. Substantially filling the mold cavity can be understood to mean filling the mold cavity to greater than 50 percent by volume. In some embodiments, the mold cavity is filled to at least 80 percent by volume, or to at least 90 percent by volume, or to at least 95 percent by volume. In some embodiments, the mold cavity 480 is completely filled with flowable material 483 except for the volume occupied by the optical stack 720.

In some embodiments, the flowable material 483 has a temperature greater than a glass transition temperature of the optical stack 720 when the flowable material 483 flows into the cavity 480. In some embodiments, the first and second molds 460 and 470 are held at a temperature below a melting point of the flowable material 483 in order to solidify the flowable material 483. In some embodiments, the temperature of the first and second molds 460 and 470 are also below the glass transition temperature of the optical stack 720 when the flowable material 483 flows into the cavity 480. For example, the flowable material 483 may have a temperature in a range of 250 to 300° C. when it is introduced into the cavity 480, the first and second molds may have a temperature in a range of 75 to 100° C., and the optical stack 720 may have a glass transition temperature in a range of 105 to 130° C. In some embodiments, the optical stack 720 has multiple layers and the flowable material 483 has a temperature greater than a glass transition temperature of each layer of the optical stack 720 when the flowable material 483 flows into the cavity 480. In some embodiments, the optical stack 720 has multiple layers and the flowable material 483 has a temperature greater than a glass transition temperature of at least one layer of the optical stack 720 when the flowable material 483 flows into the cavity 480. In some embodiments, the optical stack 720 has multiple layers and the flowable material 483 has a temperature greater than a glass transition temperature of the layer of the optical stack 720 immediately adjacent the flowable material 483 when the flowable material 483 flows into the cavity 480 and contacts the optical stack 720. This layer may be a skin layer of an integrally formed optical film included in the optical stack 720, for example. In some embodiments, the optical stack 720 includes multiple layers include birefringent polymeric layers and the and the flowable material 483 has a temperature greater than a glass transition temperature of the birefringent polymeric layers when the flowable material 483 flows into the cavity 480.

In some embodiments, a melting temperature of the formed optical element is substantially larger than the glass transition temperature of the optical film or optical stack (the glass transition temperature may be any of the glass transition temperatures described above). A substantially larger temperature refers to a temperature greater than 10° C. larger unless indicated differently. In some embodiments, the melting temperature of the optical element is at least about 50° C. larger, or at least about 80° C. larger than the glass transition temperature of the optical film. In some embodiments, an absolute value of a difference between the melting temperature of the optical element and a melting temperature of the optical film is less than about 50° C., or less than about 30° C., or less than about 20° C., or less than about 10° C. In some embodiments, a melting temperature of the optical element is about the same as a melting temperature of the optical film. About the same temperature refers to temperatures differing by less than 10° C. unless indicated differently. The melting temperature of the optical film can be the melting temperature any of the layers described for the glass transition temperature. For example, the melting temperature may be the layer of the optical film immediately adjacent the flowable material 483 when the flowable material 483 flows into the cavity 480 and contacts the optical film.

In some embodiments, the optical stack 720 includes a liner as described elsewhere herein. In some embodiments, the liner has a glass transition temperature greater than about 50° C. or greater than about 80° C.

The glass transition temperature of the various films or layers can be determined by differential scanning calorimetry as described in the test standard ASTM E1356-08(2014) "Standard Test Method for Assignment of the Glass Transition Temperatures by Differential Scanning calorimetry".

In some embodiments, the first mold 460 is a first mold insert which is configured to be placed in a mold base. Similarly, in some embodiments, second mold 470 is a second mold insert which is configured to be placed in a mold base.

The first curved mold surface 462 has a best-fit spherical first radius of curvature R which, in some embodiments, is in a range from about 30 mm to about 1000 mm. The first curved mold surface 462 has a sag S. In some embodiments, a ratio of the sag S to the best-fit spherical first radius of curvature R is in a range of about 0.02 to about 0.4, or about 0.02 to about 0.3, or in a range of about 0.02 to about 0.25, or in a range of about 0.02 to about 0.2, or in a range of about 0.02 to about 0.15, or in a range of about 0.02 to about 0.12, or in a range of about 0.03 to about 0.12, or in a range of about 0.04 to about 0.12. In some embodiments, the optical stack 720, or a protective coating included in the optical stack 720, has a sag to radius ratio in any of these ranges. The best-fit spherical radius of curvature of a surface is the radius of a sphere that minimizes the squared distance along a normal to the sphere from the sphere to the surface. The best-fit spherical radius of curvature can be determined using conventional least squares fitting techniques. A shape described as having a best-fit spherical radius of curvature may, for example, be spherical, aspherical, elliptical, or may have some other shape. Any shape of a major surface of an optical lens, for example, has a best-fit spherical radius of curvature. The first mold surface 462 may have a shape characterized by a lens base curve (e.g., a 6 base to a 10 base lens geometry).

Figure 11:
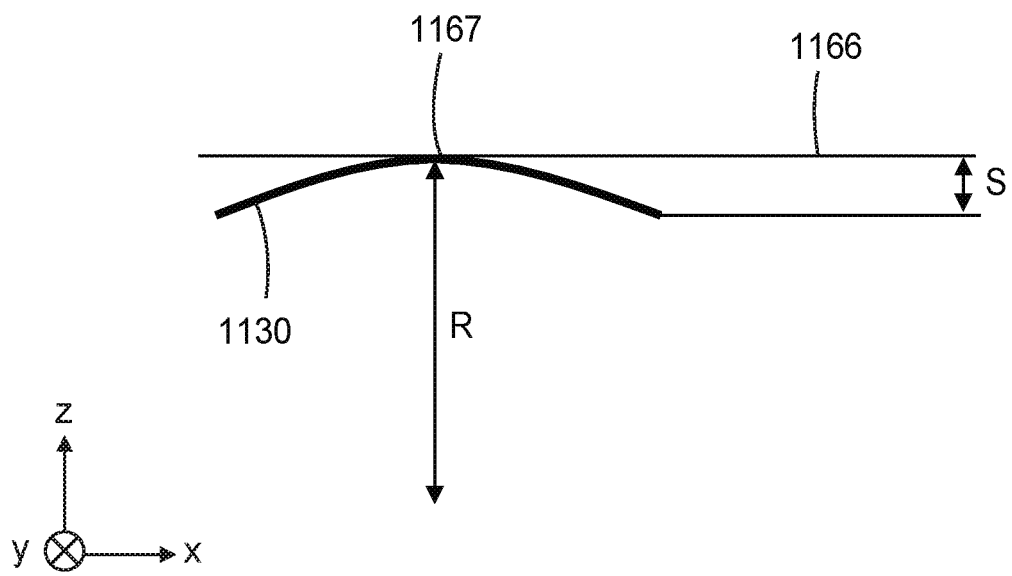
FIG. 11 is a schematic cross-sectional view of a protective coating.

In some embodiments, the optical stack 720 includes an optical film having a protective coating (e.g., hardcoat) as described further elsewhere herein facing the first mold 460. The protective coating may have a same best-fit spherical first radius of curvature R and sag S as the first mold 460. The sag S of the protective coating can be described as a maximum displacement from a plane tangent to the protective coating at the center of the protective coating. For example, FIG. 11 schematically illustrates the shape of a protective coating 1130 having a best-fit spherical first radius of curvature R and a maximum displacement S from a plane 1166 (parallel to the x-y plane) tangent to the protective coating 1130 at the center 1167 of the protective coating 1130. The protective coating 1130 is typically disposed at an outermost major surface of an optical film (not shown in the schematic illustration of FIG. 11). In some embodiments, an optical axis of the resulting optical assembly passes through the center 1167 of the protective coating 1130.

In some embodiments, the protective coating has a best-fit spherical radius of curvature R of 30 mm to 1000 mm, or 30 mm to 300 mm, or 30 mm to 100 mm, or 40 mm to 85 mm, or 58 mm to 76 mm, or 65 mm to 68 mm, or 66 mm to 67 mm. In some embodiments, the protective coating has a maximum displacement (sag S) from a plane tangent to the protective coating at the center of the protective coating of 5 mm to 50 mm, or 10 mm to 25 mm, or 13 mm to 20 mm, or 15 mm to 20 mm, or 18 mm to 19 mm. In some embodiments, a ratio of the maximum displacement (sag S) to the best-fit spherical radius of curvature R is in a range of 0.02 to 0.4 or in any of the ranges described for the first curved mold surface 462.

Figure 7D:
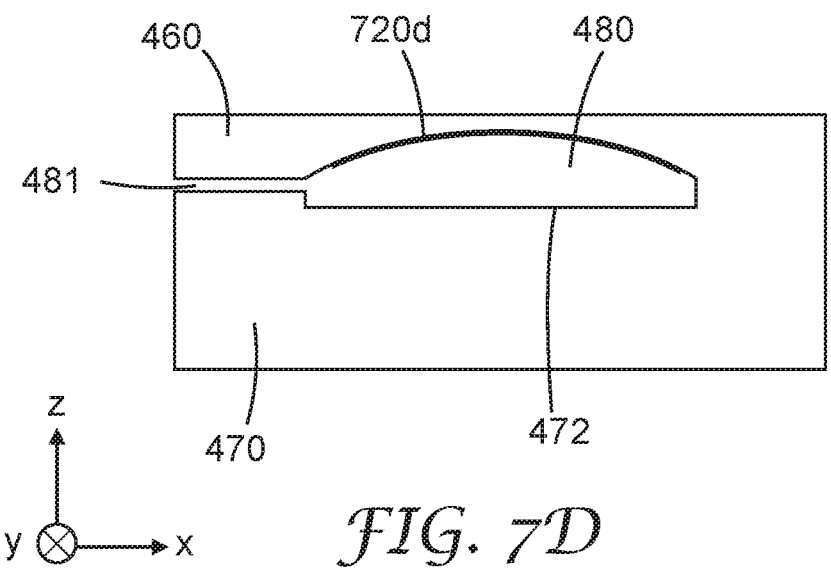

FIG. 7D is a schematic cross-sectional view of an alternative optical stack 720d disposed on the first curved mold surface 462 of the first mold 460. In this case, the optical stack 720d does not extend to the edges of the first curved mold surface 462. The optical assembly resulting from injection molding a lens onto to optical stack 720d may be as described for optical assembly 600, for example.

Figure 7E:
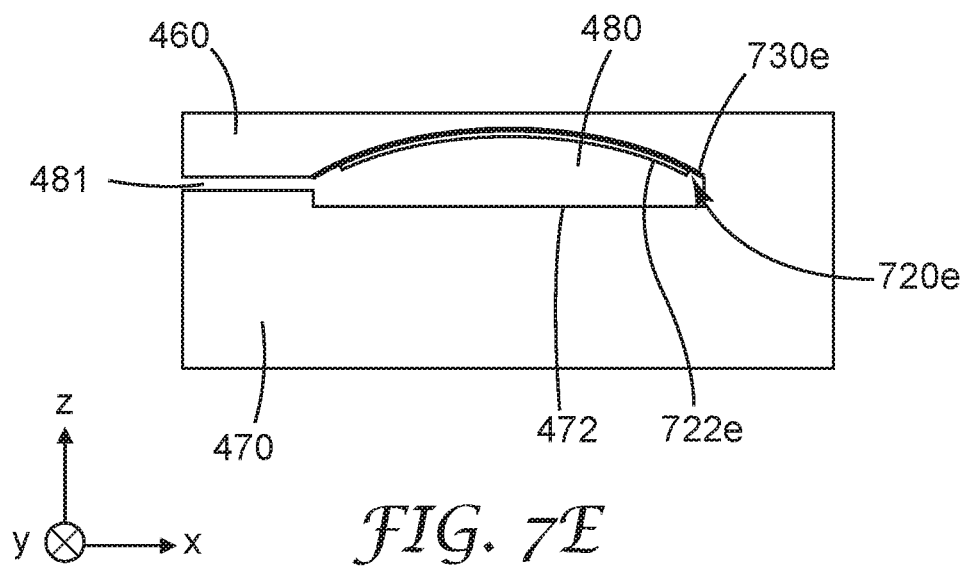

FIG. 7E is a schematic cross-sectional view of an alternative optical stack 720e disposed on the first curved mold surface 462 of the first mold 460. In this case, the optical stack 720e includes an optical film 722e that does not extend to the edges of the first curved mold surface 462 and an additional layer 730e (e.g., a liner releasable attached to the optical film 722e). The optical assembly resulting from injection molding a lens onto to optical stack 720e may be as described for optical assembly 500, for example. The optical film 722e may include a plurality of alternating polymeric layers and may include a protective coating, as described further elsewhere herein, disposed between the plurality of alternating polymeric layers and the additional layer 730e.

The insert molding process can be repeated using a first optical element injection molded onto an optical film as an insert for a second insert molding process that forms a second optical element on the optical film opposite the first optical element.

Figure 8A:
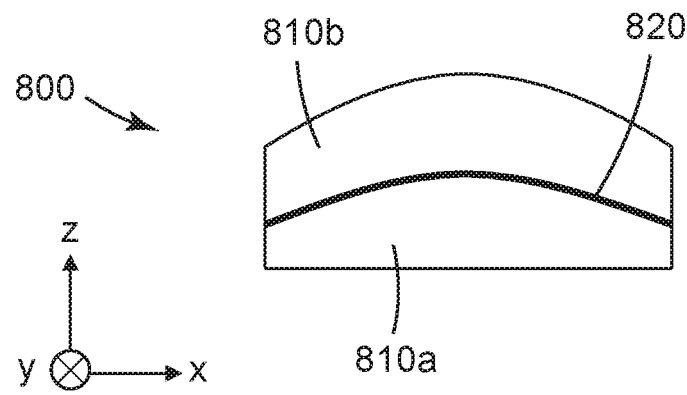
FIGS. 8A-8C are schematic cross-sectional views of optical assemblies.

FIG. 8A is a schematic cross-sectional view of an optical assembly 800 including an optical stack or optical film 820; a first optical element 810a, which may be injection insert molded directly onto the optical film 820; and a second optical element 810b disposed on the optical film 820 opposite the first optical element 810a. The second optical element 810b may be injection insert molded directly onto the optical film 820 opposite the first optical element 810a. In some embodiments, the first and second optical elements 810a and 810b are first and second lenses. In some embodiments, each location on each of the first and second lenses has an optical retardance of no more than about 10 nm.

Figure 8B:
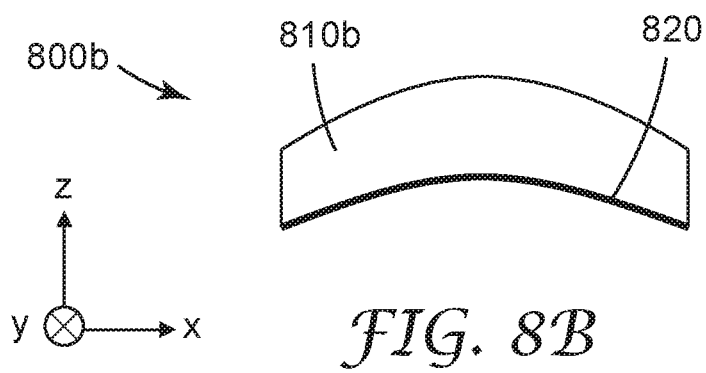

In some embodiments, a lens having the shape of second optical element 810b is molded onto optical film 820 without including first optical element 810a. FIG. 8B is a schematic cross-sectional view of optical assembly 800b including optical film 820 and the optical element 810b, which may be injection insert molded directly onto the optical film 820.

Figure 8C:
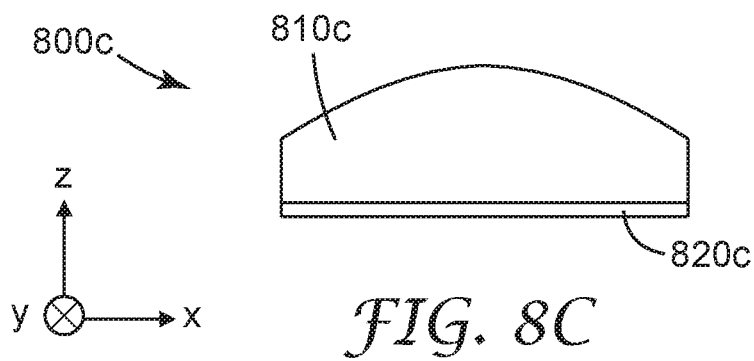

Another embodiment is illustrated in FIG. 8C which is a schematic cross-section view of optical assembly 800c including an optical stack or optical film 820c and an optical element 810c insert molded onto the optical stack or optical film 820c. In this case, the optical stack or optical film 820c is disposed on a substantially planar surface of the optical element 810c.

Figure 9:
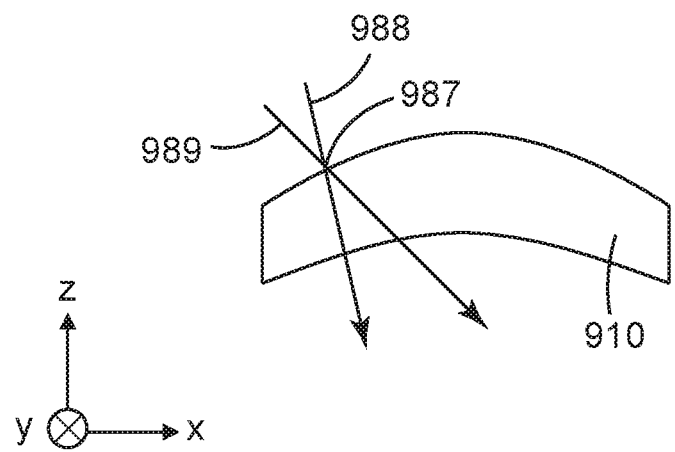
FIG. 9 is a schematic cross-sectional view of an optical element.

The optical retardance at a location on an optical element, such as a lens, is the phase retardance of light transmitted through the optical element that passes through the location and that has a shortest path through the optical element. For example, FIG. 9 schematically illustrates two light rays 988 and 989 incident on optical element 910 at location 987 and transmitted though optical element 910. The optical retardance is specified with respect to light ray 989 since this has the shortest path through the optical element 910 for light rays passing through location 987. When the opposing major surfaces of the optical element 910 are about parallel, approximately normally incident light has the shortest path through the optical element. When the opposing major surfaces are not parallel, the shortest path may be for non-normally incident light. The phase retardance is the maximum difference in phase for two orthogonally polarized light rays through the location. The wavelength of the incident light ray is about 550 nm unless specified differently. The optical retardance of an optical element may be characterized by the locations on a major surface of the optical element. In some embodiments, an optical element, such as a lens, has a low optical retardance. In some embodiments, the optical retardance is no more than about 10 nm at each location over at least 80%, or at least 90% of a major surface (by surface area) of the optical element. In some embodiments, the optical retardance at each location on the optical element is no more than about 10 nm, or no more than about 7 nm. In some embodiments, the optical element is a lens having an optical retardance at the center of the lens of no more than about 5 nm.

In some embodiments, the optical retardance is low (e.g., in any of the above ranges) even when the lens has a substantial thickness variation. For example, in some embodiments a lens has an optical retardance of no more than about 10 nm at each location over at least 80% of a major surface of the lens, and has a lens thickness at a first lens location at least about 20% greater, or at about least 30% greater, or at least about 40% greater, or at least about 50% greater, or at least about 75% greater, or at least about 100% greater, or at least about 150% greater, or at least about 200% greater than a lens thickness at a second lens location.

The optical retardance of an optical element can be made low (e.g., less than 10 nm) by using a low retardance material as the flowable material 483 in making the optical element and/or by maintaining the flowable material 483 at an elevated temperature after filling the mold cavity 480 with the flowable material 483 for long enough that the birefringence substantially relaxes out. Suitable materials that can be used for flowable material 483 include polymethylmethacrylate (PMMA), polycarbonate, polystyrene, cyclic olefin, and polyethylene terephthalate (PET). A suitable PMMA which provides low birefringence is Optimas 7500 available form Mitsubishi Gas Chemical Company, Inc., for example. It has been found that optical films having a plurality of alternating polymeric layers can still provide a high reflectivity for at least one polarization state when the lens or optical element has a melting point higher than a glass transition temperature of the optical film, but less than a melting temperature of the optical films, even when the optical element is allowed to relax to a low birefringence.

Even when the birefringence is allowed to relax to a lower value, there still may be a residual birefringence and optical retardance, though the optical retardance may be low (e.g., no more than 10 nm). In some embodiments, the optical retardance exhibits some spatial variation through the optical element while remaining no more than about 10 nm. In some embodiments, an optical retardance of the optical element, which may be a lens, at least one location closer to an edge of the optical element is greater than an optical retardance of the optical element at at least one location closer to a center of the optical element.

Figure 10:
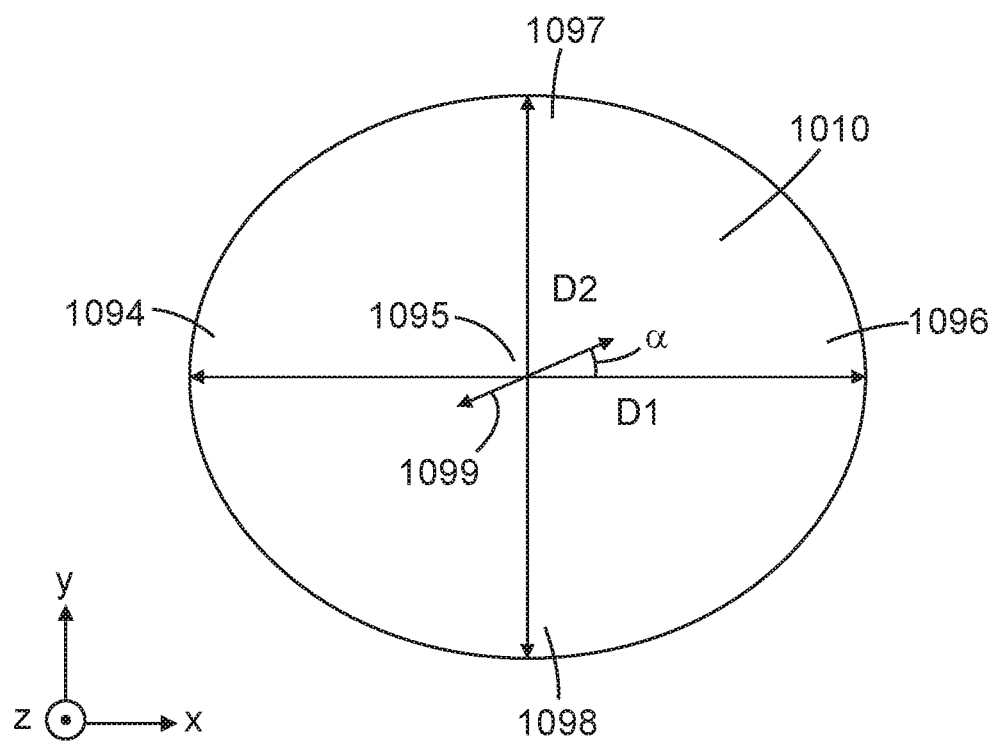
FIG. 10 is a schematic top plan view of a lens.

FIG. 10 is a schematic top plan view of a lens 1010 which has a largest lateral dimension along a first direction (parallel to x-direction) of D1 and has a largest lateral dimension along an orthogonal second direction (parallel to y-direction) of D2. D1 may be larger than, smaller than, or about the same as D2. In some embodiments, the lens 1010 has an optical retardance that varies more along the largest lateral dimension in the first direction D1, that varies less along the largest lateral dimension in the orthogonal second direction D2, and that is no more than about 10 nm at each location on the lens 1010. In some cases, the variation in optical retardance is due to the injection insert molding process used to make the lens 1010 with the optical retardance being higher near the gate and lower elsewhere. For example, first edge location 1094 may be an edge location near the gate and may have a higher optical retardance than center location 1095. In some embodiments, first edge location 1094 has an optical retardance higher than that at center location 1095 and higher than that at second edge location 1096. In some embodiments, third edge location 1097 and fourth edge location 1098 have an optical retardance within R1 of the optical retardance at the center location 1095 and first edge location 1094 has an optical retardance greater than R2 plus the optical retardance at the center location 1095 where R2>R1. For example, R2 may be 2.5 nm, R1 may be 1.5 nm, the optical retardance at the center location 1095 may be 4 nm, the optical retardance at each of the second, third, and fourth edge locations 1096, 1097, and 1098 may be each about 5 nm and the optical retardance at the first edge location 1094 may be about 7 nm. In some embodiments, the highest optical retardance occurs at the first edge location 1094 (near the gate) and the lowest optical retardance occurs at the center location 1095.

Edge and center locations refer to locations closer to an edge or to a center, respectively, of the lens 1010. The center of the lens 1010 may refer to the center in plan view where the first and second directions cross. In some embodiments, a center location is within 10% of the smaller of D1 and D2 of a center of the lens 10 and an edge location is within 10% of the smaller of D1 and D2 of an edge of the lens 10.

In some embodiments, the lens 1010 is molded onto an optical film or an optical stack including an optical film where the optical film is a reflective polarizer, each location on the reflective polarizer substantially reflecting normally incident light having the predetermined wavelength and a block polarization state and substantially transmitting normally incident light having the predetermined wavelength and an orthogonal pass polarization state. In some embodiments, the first direction is substantially parallel to the block polarization state at a center of the reflective polarizer. In some embodiments, the first direction is substantially parallel to the pass polarization state at a center of the reflective polarizer. In some embodiments, the first direction is at an oblique angle to the block polarization state at a center of the reflective polarizer. For example, the block axis of the reflective polarizer at the center of the reflective polarizer may be along the axis 1099 making an angle α with the first direction along D1. In some embodiments, the angle α is less than 10 degrees.

Terms such as "about" or "substantially" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

EXAMPLES

| MATERIALS USED IN THE EXAMPLES | |
|---|---|
| DESIGNATION | DESCRIPTION |
| DESN100 | DESMODUR N100 biuret-based hexamethylene diisocyanate oligomer, 100% solids, 22.0 wt. % NCO, 191 g/eq., obtained from Covestro LLC, Pittsburgh, Pennsylvania |
| HEA | 2-hydroxyethyl acrylate, obtained from Alfa Acsar. Tewksbury, Massachusetts |
| PETA | Pentaerythritol triacrylate, obtained from Sartomer Co., Exton, Pennsylvania, as SR444C |
| HDDA | 1,6-hexanediol diacrylate, obtained from Sartomer Co. as SR238B |
| MEK | Methyl ethyl ketone |
| MP | 1-methoxy-2-propanol |
| APFT FILM | A reflective polarizer multilayer optical film as described in Example 3 of PCT Application PCT/IB2018/051186, filed Feb. 26, 2018 and entitled "High Contrast Optical Film and Devices Including the Same" |
| ESACURE ONE | Photoinitiator, obtained from Lamberti USA, Conshohocken, Pennsylvania |
| SR611 | Alkoxylated tetrahydrofurfuryl acrylate monomer from Sartomer Co. |
| 4-hydroxy TEMPO | 4-Hydroxy-2,2,6,6-tetramethyl piperidine 1-oxyl, available from Sigma-Aldrich, St. Louis, Missouri |
| MEHQ | 4-methoxy phenol, available from Sigma-Aldrich |
| TEG2100 | TEGORAD 2100 silicone acrylate, obtained from Evonik Industries, Essen, Germany |
| DBTDL | Dibutyltin dilaurate available from Sigma-Aldrich |
| CN9039 | Aliphatic urethane acrylate oligomer from Sartomer Co. |
| EB 8301R | Aliphatic urethane acrylate oligomer from Allnex, Alpharetta, Georgia |
| CN9010 | Aliphatic urethane acrylate oligomer from Sartomer Co. |
| CN968 | Aliphatic urethane acrylate oligomer from Sartomer Co. |
| GEN 4690 | Aliphatic urethane acrylate oligomer from Rahn USA Corp., Aurora, Illinois |
| EB 1290 | Aliphatic urethane acrylate oligomer from Allnex |
| CN9006 | Aliphatic urethane acrylate oligomer from Sartomer Co. |
| CN9025 | Aliphatic urethane acrylate oligomer from Sartomer Co. |
| EB 4858 | Aliphatic urethane acrylate oligomer from Allnex |
| EB 8604 | Aliphatic urethane acrylate oligomer from Allnex |
| BYK-W 9012 | Copolymer with acidic groups for improving wetting and dispersing properties, from BYK USA, Wallingford, Connecticut |
| Alpha alumina Nano Powder | Ultrapure alpha-Alumina ($Al_2O_3$ Nano Powder, 26N-0811UPA from Inframat, Manchester, Connecticut |

Preparative Example, Polyurethane Acrylate PUA9 DESN100-0.5 PETA-0.5 HEA

A 250-mL jar equipped with a magnetic stir bar was charged with 39.76 g (0.2082 eq.) of DESN100, 25 g of MEK, 12.33 g (0.1062 eq.) of HEA, 47.91 g (0.1062 eq.) of PETA, for a total of 1.01 eq. OH per eq. of NCO, 0.025 g (250 ppm) BHT, 0.005 g (50 ppm) of 4-hydroxy TEMPO, and 0.05 g (500 ppm) of DBTDL. The jar was placed in a water bath at room temperature and allowed to stir for 10 min. After 10 min., it was placed into a 55° C. bath for 4 hr. At the end of that time, the reaction mixture was monitored by Fourier Transform Infrared Spectroscopy (FTIR) and found to have no NCO peak at 2265 cm$^{-1}$. The resulting material was 80 wt. % solids.

Polyurethane Acrylate Preparative Examples PUA1-PUA8 and PUA10-PUA19

PUA1-PUA8 and PUA10-PUA19 were prepared in the same manner as PUA9 described above by reacting the preparations reported in Table 1. The reactions were carried out using an appropriately sized jar. The amount of materials used in preparations described in Table 1 were reported in grams (g) and unless noted otherwise, further included 250 ppm BHT, 50 ppm TEMPO, and 500 ppm DBTDL with respect to solids. The resulting products were 80 wt % solids in MEK.

The average ((meth)acrylate) functionality of the polyurethane acrylates (PUAs) was calculated in the following fashion. The functionality of the added acrylates for each compound was first calculated. For instance, the PUA6 above was designated as 1.0 DESN100+0.25 HEA+0.75 PETA. This means that the compound was the reaction product of 1 equivalent of isocyanate groups (as DESN100) and 0.25 hydroxyl equivalents of hydroxyethyl acrylate and 0.75 hydroxyl equivalents of PETA. The HEA has 1 acrylate group per hydroxyl group and the PETA has 3 acrylate groups per hydroxyl group. The functionality of added acrylates for this compound was then (0.25·1)+(0.75·3) or 2.5. The average (meth)acrylate functionality was found by multiplying the functionality of the added acrylates for each compound by the average functionality of the polyisocyanate. According to the vendor Covestro, the average functionality for DESN100 was 3.6, so the average (meth)acrylate functionality for the compound was 2.5·3.6 or 9. The summary of average ((meth)acrylate) functionality is reported in Table 1 (above).

The molecular weight of the PUAs in grams/mole was calculated in the following fashion, illustrating with PUA6. The average functionality of DESN100 was 3.6. This was multiplied by the equivalent fraction of DESN100, which was 1.0, times 3.6, which was the average functionality of DESN100, times the equivalent weight (EW) of DESN100, which was 190.9 g/eq. This was the contribution of DESN100 to the molecular weight. We multiplied the equivalent fraction of HEA, which was 0.25, times 3.6, which was the average functionality of DESN100, times the EW of HEA, which was 116.12 g/eq. This was the contribution of HEA to the molecular weight. We multiplied the equivalent fraction of PETA, which was 0.75, times 3.6, which was the average functionality of DESN100, times the EW of PETA, which was 451.3 g/eq. This was the contribution of PETA to the molecular weight. The sum of the contributions of DESN100, HEA, and PETA was the molecular weight. The overall calculation is: 1.0·3.6·190.9+0.25·3.6·116.12+0.75·3.6·451.3=2010 g/mole. A summary of these calculations is reported in Table A, below.

TABLE 1

PREPARATION of PUAs

| URETHANE ACRYLATE | DESN100, eq | HEA, eq | PETA, eq | DESN100, grams | HEA, grams | PETA, grams | MEK, grams | Avg. Functionality | Molecular Weight, g/mole | Acrylate Equivalent Weight g/eq |
|---|---|---|---|---|---|---|---|---|---|---|
| PUA1  | 1.00 | 0.0  | 1.0  | 29.32  | 0     | 70.68  | 25.0  | 10.8 | 2312 | 214 |
| PUA2  | 1.00 | 0.05 | 0.95 | 87.63  | 51.66 | 10.71  | 37.5  | 10.4 | 2252 | 216 |
| PUA3  | 1.00 | 0.10 | 0.90 | 83.20  | 46.46 | 20.34  | 37.5  | 10.1 | 2191 | 217 |
| PUA4  | 1.00 | 0.15 | 0.85 | 79.19  | 41.77 | 29.04  | 37.5  | 9.7  | 2131 | 219 |
| PUA5  | 1.00 | 0.20 | 0.80 | 75.55  | 37.50 | 36.95  | 37.5  | 9.4  | 2071 | 221 |
| PUA6  | 1.00 | 0.25 | 0.75 | 33.75  | 5.23  | 61.01  | 25.0  | 9.0  | 2010 | 223 |
| PUA7  | 1.00 | 0.33 | 0.67 | 213.18 | 44.09 | 342.73 | 150.0 | 8.4  | 1914 | 227 |
| PUA8  | 1.00 | 0.42 | 0.58 | 225.12 | 58.20 | 316.68 | 150.0 | 7.8  | 1805 | 232 |
| PUA9  | 1.00 | 0.50 | 0.50 | 39.76  | 12.33 | 47.91  | 25.0  | 7.2  | 1709 | 237 |
| PUA10 | 1.00 | 0.55 | 0.45 | 247.27 | 84.39 | 268.34 | 150.0 | 6.8  | 1648 | 241 |
| PUA11 | 1.00 | 0.58 | 0.42 | 253.50 | 91.76 | 254.73 | 150.0 | 6.6  | 1612 | 243 |
| PUA12 | 1.00 | 0.60 | 0.40 | 256.75 | 95.59 | 247.67 | 150.0 | 6.5  | 1588 | 245 |
| PUA13 | 1.00 | 0.67 | 0.33 | 270.57 | 111.93| 217.50 | 150.0 | 6.0  | 1503 | 252 |
| PUA14 | 1.00 | 0.75 | 0.25 | 48.37  | 22.50 | 29.14  | 25.0  | 5.4  | 1407 | 261 |
| PUA15 | 1.00 | 0.80 | 0.20 | 48.70  | 6.04  | 95.26  | 37.5  | 5.0  | 1347 | 267 |
| PUA16 | 1.00 | 0.85 | 0.15 | 47.30  | 4.40  | 98.30  | 37.5  | 4.7  | 1286 | 275 |
| PUA17 | 1.00 | 0.90 | 0.10 | 45.97  | 2.85  | 101.17 | 37.5  | 4.3  | 1226 | 284 |
| PUA18 | 1.00 | 0.95 | 0.05 | 44.42  | 1.38  | 104.21 | 37.5  | 4.0  | 1166 | 294 |
| PUA19 | 1.00 | 1.00 | 0.00 | 61.96  | 38.04 | 0      | 25.0  | 3.6  | 1105 | 307 |

TABLE A

| URETHANE ACRYLATE | DESN100 Equivalent | DESN100 Equivalent Wt., g/eq | Functionality | HEA Equivalents | HEA Equivalent Weight, g/eq | PETA Equivalent | PETA Equivalent Weight, g | Molecular Weight, g/mole |
|---|---|---|---|---|---|---|---|---|
| PUA1  | 1.00 | 190.9 | 3.6 | 0.00 | 116.12 | 1.00 | 451.3 | 2312 |
| PUA2  | 1.00 | 190.9 | 3.6 | 0.05 | 116.12 | 0.95 | 451.3 | 2252 |
| PUA3  | 1.00 | 190.9 | 3.6 | 0.10 | 116.12 | 0.90 | 451.3 | 2191 |
| PUA4  | 1.00 | 190.9 | 3.6 | 0.15 | 116.12 | 0.85 | 451.3 | 2131 |
| PUA5  | 1.00 | 190.9 | 3.6 | 0.20 | 116.12 | 0.80 | 451.3 | 2071 |
| PUA6  | 1.00 | 190.9 | 3.6 | 0.25 | 116.12 | 0.75 | 451.3 | 2010 |
| PUA7  | 1.00 | 190.9 | 3.6 | 0.33 | 116.12 | 0.67 | 451.3 | 1914 |
| PUA8  | 1.00 | 190.9 | 3.6 | 0.42 | 116.12 | 0.58 | 451.3 | 1805 |
| PUA9  | 1.00 | 190.9 | 3.6 | 0.50 | 116.12 | 0.50 | 451.3 | 1709 |
| PUA10 | 1.00 | 190.9 | 3.6 | 0.55 | 116.12 | 0.45 | 451.3 | 1648 |
| PUA11 | 1.00 | 190.9 | 3.6 | 0.58 | 116.12 | 0.42 | 451.3 | 1612 |
| PUA12 | 1.00 | 190.9 | 3.6 | 0.60 | 116.12 | 0.40 | 451.3 | 1588 |
| PUA13 | 1.00 | 190.9 | 3.6 | 0.67 | 116.12 | 0.33 | 451.3 | 1503 |
| PUA14 | 1.00 | 190.9 | 3.6 | 0.75 | 116.12 | 0.25 | 451.3 | 1407 |
| PUA15 | 1.00 | 190.9 | 3.6 | 0.80 | 116.12 | 0.20 | 451.3 | 1347 |
| PUA16 | 1.00 | 190.9 | 3.6 | 0.85 | 116.12 | 0.15 | 451.3 | 1286 |
| PUA17 | 1.00 | 190.9 | 3.6 | 0.90 | 116.12 | 0.10 | 451.3 | 1226 |
| PUA18 | 1.00 | 190.9 | 3.6 | 0.95 | 116.12 | 0.05 | 451.3 | 1166 |
| PUA19 | 1.00 | 190.9 | 3.6 | 1.00 | 116.12 | 0.00 | 451.3 | 1105 |

The Acrylate EW of the PUAs in g/equivalent is calculated by dividing the molecular weight of the polyurethane by the average ((meth)acrylate) functionality. To illustrate with PUA6, that is 2010/9=223.33 g/eq or 223 g/eq.

Preparative Examples 1-18 (PE1-PE18) and Comparative Examples 1-11 (CE1-CE11)

Coating solutions of the respective polyurethane acrylates PUA1-PUA19 and a few commercial urethane acrylates such as CN9039 were prepared by mixing components as reported in Table 2 to prepare coating solutions for making preparatory film examples. Then, to prepare each preparative or comparative example, the indicated coating solution composition in Table 2 was coated at 32 weight percent solids onto APFT FILM. The coating was done using a No. 7 wire-wound rod (available from RD Specialties, Webster, N.Y.). The coating was dried at 90° C. for 1.5 min. The dried coating was then cured using an ultraviolet (UV) processor equipped with an H-type bulb (500 W, available from Heraeus Noblelight America/Fusion UV Systems, Gaithersburg, Md.) at 100% power under nitrogen at 50 feet/minute (15.2 m/min). The cured coating had an estimated thickness of about 3.4 micrometers. The resulting films were designated PE1-PE18 and comparative films CE1-CE11, depending on whether they passed the thermoforming cracking test described below, as shown in Table 3.

TABLE 2

COATING FORMULATIONS of URETHANE ACRYLATES

| | CHARGE, g | SOLIDS, g | SOLVENT, g | WEIGHT PERCENT SOLIDS | WEIGHT PERCENT OF COATING SOLUTION |
|---|---|---|---|---|---|
| PREPARATIVE EXAMPLES PE1-PE15 AND COMPARATIVE EXAMPLES CE1-CE4 | | | | | |
| URETHANE ACRYLATE | 9.33 | 7.464 | 1.866 | 93.3 | 37.32 |
| HDDA | 0.16 | 0.16 | | 2.00 | 0.64 |
| SR611 | 0.16 | 0.16 | | 2.00 | 0.64 |
| TEG2100 | 0.056 | 0.056 | | 0.70 | 0.22 |
| ESACURE ONE | 0.16 | 0.16 | | 2.00 | 0.64 |
| MP | 15.134 | | 15.134 | 0.00 | 60.54 |
| PREPARATIVE EXAMPLES PE16-PE18 AND COMPARATIVE EXAMPLES CE5-CE11 | | | | | |
| URETHANE ACRYLATE | 7.464 | 7.464 | | 93.3 | 29.86 |
| HDDA | 0.16 | 0.16 | | 2.00 | 0.64 |
| SR611 | 0.16 | 0.16 | | 2.00 | 0.64 |

TABLE 2-continued

COATING FORMULATIONS of URETHANE ACRYLATES

| | CHARGE, g | SOLIDS, g | SOLVENT, g | WEIGHT PERCENT SOLIDS | WEIGHT PERCENT OF COATING SOLUTION |
|---|---|---|---|---|---|
| TEG2100 | 0.056 | 0.056 | | 0.7 | 0.22 |
| ESACURE ONE | 0.16 | 0.16 | | 2.00 | 0.64 |
| MP | 17 | | 17 | | 68.00 |

Film Thermoforming & Molding of 6 & 8 Base Lenses

The abrasion-resistant multilayer optical film was formed using an AccuForm thermoforming system, available Hy-Tech Forming Systems (USA), Inc. The system uses heat and high pressure to form to the tool geometry used. A female mold having 6 base lens geometry (corresponding to a 89.15 mm spherical radius of curvature and a maximum depth of 11.68 mm), or 8 base lens geometry (corresponding to a 66.25 mm spherical radius of curvature and a maximum depth of 18.5 mm) was used. A protective film liner (OCPET NSA33T, Sun A Kaken Co, Ltd) was disposed on each major surface of the film. The film was clamped in the AccuForm system with the coated side of the film facing the curved mold surface of the female mold, heated to 350° F. (177° C.), and pressurized air was applied to the top of the film to force it into the lens tool geometry. The film was cooled and the form film was removed from the system.

The formed film was inspected visually for cracks in the film hard coat. The method used was to record the percent of the radius at any point that was cracked so if there was cracking that extended from the center of the lens for 50% of the radius the result was recorded as extent of crack is 50%.

The Formed film was trimmed to the final molded lens size, the liner opposite the coated side of the film was removed, and an injection molding process was used to insert mold the film on one side (opposite the remaining liner) of the final lens geometries (6 Base and 8 Base). The remaining liner was removed after molding the lens onto the film.

The injection molding was performed by a 65 ton press from KraussMaffei Technologies GmbH and the molding resin used was Mitsubishi Gas Chemical Company Optimas 7500 (PMMA) resin. Results are reported in Table 3, below.

TABLE 3

THERMOFORMING RESULTS

| | SOURCE (URETHANE ACRYLATE) | THERMOFORMING RESULT, EXTENT OF CRACKING 6 BASE LENS FORM | THERMOFORMING RESULT, EXTENT OF CRACKING 8 BASE LENS FORM |
|---|---|---|---|
| CE1 | PUA1 | 20% | 95% |
| CE2 | PUA2 | 30% | 90% |
| CE3 | PUA3 | 25% | 85% |
| CE4 | PUA4 | 5% | 80% |
| PE1 | PUA5 | 0% | 75% |
| PE2 | PUA6 | 0% | 75% |
| PE3 | PUA7 | 0% | 75% |
| PE4 | PUA8 | 0% | 75% |
| PE5 | PUA9 | 0% | 75% |
| PE6 | PUA10 | 0% | 60% |
| PE7 | PUA11 | 0% | 15% |
| PE8 | PUA12 | 0% | 20% |
| PE9 | PUA13 | 0% | 5% |
| PE10 | PUA14 | 0% | 10% |
| PE11 | PUA15 | 0% | 5% |
| PE12 | PUA16 | 0% | 0% |
| PE13 | PUA17 | 0% | 0% |
| PE14 | PUA18 | 0% | 0% |
| PE15 | PUA19 | 0% | 0% |
| CE5 | CN9039 | 100% | 100% |
| CE6 | EB 8301R | 100% | 100% |
| CE7 | CN9010 | 85% | 100% |
| CE8 | CN968 | 100% | 100% |
| CE9 | GEN 4690 | 100% | 100% |
| CE10 | EB 1290 | 60% | 100% |
| CE11 | CN9006 | 100% | 100% |
| PE16 | CN9025 | 0% | 60% |
| PE17 | EB 4858 | 0% | 0% |
| PE18 | EB 8604 | 0% | 0% |
| PE19 | UNCOATED APFT FILM | 0% | 0% |

Abrasion Test

Abrasion of lens samples was tested using a Taber model 5750 Linear Abraser (Taber Industries, North Tonawanda, N.Y.). The collet oscillated at 40 cycles/minute. The abrasive material used for this test was an eraser insert (obtained from Summers Optical, a division of EMS Acquisition Corp., Hatfield, Pa.). The eraser insert had a diameter of 6.5 mm and met the requirements of military standard Mil-E-12397B.

The eraser insert was held in place through duration of test by the collet. A single sample was tested for each example with a total weight of 1.1 kg weight and 20 cycles. The linear abraser had a horizontal arm that reciprocated in a linear motion. Attached to the end of the arm was a ball-bearing spline shaft that created a free-floating system permitting vertical movement so that during the horizontal back and forth strokes, the collet could raise or lower to follow the lens contour. For the abrasion exposure, lens samples were mounted in a horizontal clamp so that the abraser tool could be moved across the lens sample with a total travel distance of 51 mm at a speed corresponding to a rate of 40 abrasion cycles per minute. After abrasion, the sample was cleaned of residue by wiping with a lens cleaning towelette (Radnor Products, Radnor, Pa.). The effect of the abrasion cycles on the lens samples was determined by the measurement of percent haze of each sample, before and after the linear abrasion. Percent haze was measured using a BYK Haze-Gard Plus haze meter (BYK Gardner, Columbia, Md.). Lenses were positioned in such a manner that the light impinged against the concave side of the lens. Post-abrasion haze measurements were made through a flexible 5 mm×25 mm rectangular aperture to restrict the measurement to the area of each lens given the abrasion exposure. The delta haze value for each sample was calculated by subtracting the haze of an untested region of the sample. Results for abrasion-resistant molded 6 base lens examples 1-18 (EX1-EX18), corresponding to the selected crack-resistant preparatory example thermoformed films PE1-PE18, and comparative example 12 (CE12), corresponding to PE19, are shown in Table 4.

TABLE 4

ABRASION RESISTANCE of MOLDED 6 BASE LENSES

| | SOURCE THERMOFORM | INITIAL (UNABRADED) % HAZE | POST-ABRASION % HAZE | DELTA HAZE |
|---|---|---|---|---|
| EX1 | PE1 | 0.42 | 5.55 | 5.1 |
| EX2 | PE2 | 1.1 | 6.48 | 5.4 |
| EX3 | PE3 | 0.93 | 8.78 | 7.9 |
| EX4 | PE4 | 0.84 | 7.12 | 6.3 |
| EX5 | PE5 | 0.51 | 8.7 | 8.2 |
| EX6 | PE6 | 1.04 | 9.76 | 8.7 |
| EX7 | PE7 | 0.96 | 8.11 | 7.2 |
| EX8 | PE8 | 0.97 | 10.8 | 9.8 |
| EX9 | PE9 | 0.75 | 11.3 | 10.6 |
| EX10 | PE10 | 0.97 | 12.9 | 11.9 |
| EX11 | PE11 | 0.47 | 13.1 | 12.6 |
| EX12 | PE12 | 0.41 | 13.5 | 13.1 |
| EX13 | PE13 | 0.47 | 15.7 | 15.2 |
| EX14 | PE14 | 0.5 | 12.6 | 12.1 |
| EX15 | PE15 | 0.42 | 18.6 | 18.2 |
| EX16 | PE16 | 0.47 | 19.7 | 19.2 |
| EX17 | PE17 | 0.47 | 31 | 30.5 |
| EX18 | PE18 | 0.45 | 22.8 | 22.4 |
| CE12 | PE19 | 0.38 | 52.5 | 52.1 |

Similarly, results for abrasion-resistant molded 8 base lens examples 19-24 (EX19-EX24), corresponding to the selected crack-resistant preparatory example thermoformed films PE12-PE18, and comparative example 13 (CE13), corresponding to PE19, are shown in Table 5.

TABLE 5

ABRASION RESISTANCE of MOLDED 8 BASE LENSES

| | SOURCE THERMOFORM | INITIAL (UNABRADED) % HAZE | POST-ABRASION % HAZE | DELTA HAZE |
|---|---|---|---|---|
| EX19 | PE12 | 0.74 | 17.2 | 16.5 |
| EX20 | PE13 | 0.72 | 16.3 | 15.6 |
| EX21 | PE14 | 0.83 | 23.5 | 22.7 |
| EX22 | PE15 | 0.77 | 21 | 20.2 |
| EX23 | PE17 | 0.85 | 38.9 | 38.1 |
| EX24 | PE18 | 0.96 | 29 | 28.0 |
| CE13 | PE19 | 0.54 | 51 | 50.5 |

Preparation of Example Lenses Containing Alumina Nanoparticles

Preparation of Alpha Alumina Nanoparticles (Np)

The alpha alumina nanoparticle dispersions were made through a media milling process. Methyl ethyl ketone (MEK) (185 grams), 180 grams of BYK-W 9012 dispersing additive (BYK USA, Wallingford, Conn.), and 181 grams of ultrapure alpha alumina NP (Inframat, 26N-0811UPA) were mixed together using a Dispermat CN-10 laboratory high-shear disperser (BYK-Gardner USA, Columbia, Md.). The mixed dispersion was milled in MiniCer laboratory media mill (Netzsch, Exton, Pa.) with 0.2 mm yttria stabilized zirconia milling media for 8 hours. The solid content was 54.6 weight percent. The alpha alumina NP dispersion was diluted with MEK to give a desired transmission prior to particle size analysis by laser diffraction, which was performed on Horiba LA-950 analyzer (available from Horiba, Kyoto, Japan). The medium and mean particle size were both 67 nm. Dv90 means a cumulative 90% point of diameter, which was 80 nm in this case.

Preparation of Formulation A

Formulation A was made by adding 0.64 g of photoinitiator ESACURE ONE and 0.32 g of TEG2100 to 34.80 g of PUA9 (80 weight percent in MEK), followed by dilution with 48 g of ethanol and 6.0 g of 1-methoxy-2-propanol. The resulting Formulation A had 32.1 weight percent solids.

Formulation A was used to make coating formulations in Table 6. In Table 6, SR611 was diluted to 32 weight percent solids in ethanol. Formulations in Table 6 were made by mixing the indicated amounts of ingredients at room temperature. The formulations were hand-coated on APFT FILM using a #12 wire-wound rod (available from RD Specialties, nominal wet film thickness 1.08 mils (27.4 micrometers)). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min).

TABLE 6

| FORMULATION | FORMULATION A, g | SR611, g of 32 weight percent solution | ALPHA ALUMINA NANOPARTICLES, g of dispersion in MEK | ALUMINA SOLIDS/ TOTAL SOLIDS, % | ETHANOL, g | TOTAL SOLIDS, Wt. % |
|---|---|---|---|---|---|---|
| PE20 | 4.50 | 0.25 | 0.000 | 0.0 | 0.0 | 32.1 |
| PE21 | 4.50 | 0.25 | 0.072 | 2.5 | 0.05 | 32.1 |
| PE22 | 4.50 | 0.25 | 0.150 | 5.0 | 0.10 | 32.1 |

Preparation of Formulation B

Formulation B was made by adding 0.64 g of photoinitiator ESACURE ONE and 0.32 g of TEG2100 to 34.80 g of PUA15 (80 weight percent in MEK), followed by dilution with 48 g of ethanol and 6.0 g of 1-methoxy-2-propanol. The resulting Formulation B had 32.1 weight percent solids.

Formulation B was used to make coating formulations in Table 7. In Table 7, SR611 was diluted to 32 weight percent solids in ethanol. Formulations in Table 7 were made by mixing the indicated amounts of ingredients at room temperature. The formulations were hand-coated on APFT FILM using a #12 wire-wound rod (available from RD Specialties, nominal wet film thickness 1.08 mils (27.4 micrometers)). The coated PC films were allowed to dry at room temperature first and then dried at 80° C. in an oven for 1 min. The dried samples were cured using a UV processor equipped with an H-type bulb (500 W, Heraeus Noblelight America/Fusion UV Systems, Gaithersburg, Md.) at 100% power under nitrogen purge at 50 feet/min (15.2 m/min).

TABLE 7

| FORMULATION | FORMULATION B, g | SR611, g of 32 weight percent solution | ALPHA ALUMINA NANOPARTICLES, g of dispersion in MEK | ALUMINA SOLIDS/ TOT. SOLIDS, % | ETHANOL, g | TOTAL SOLIDS, Wt. % |
|---|---|---|---|---|---|---|
| PE23 | 4.50 | 0.25 | 0.000 | 0.0 | 0.0 | 32.1 |
| PE24 | 4.50 | 0.25 | 0.072 | 2.5 | 0.05 | 32.1 |
| PE25 | 4.50 | 0.25 | 0.150 | 5.0 | 0.10 | 32.1 |

Thermoforming and crack test results of preparatory examples PE20-PE25, corresponding to examples EX25-EX30, are provided in Table 8 below.

TABLE 8

| | | THERMOFORMING RESULTS | |
|---|---|---|---|
| COATED FILMS | FORMU- LATION | THERMOFORMING RESULT, EXTENT OF CRACKING 6 BASE LENS FORM | THERMOFORMING RESULT, EXTENT OF CRACKING 8 BASE LENS FORM |
| EX25 | PE20 | 0% | 60% |
| EX26 | PE21 | 0% | 60% |
| EX27 | PE22 | 0% | 50% |
| EX28 | PE23 | 0% | 35% |
| EX29 | PE24 | 0% | 35% |
| EX30 | PE25 | 0% | 30% |

Abrasion resistance test results for molded 6 base lenses using the films of examples EX25-EX30 are provided below in Table 9.

TABLE 9

| ABRASION RESISTANCE of MOLDED 6 BASE LENSES | | | | |
|---|---|---|---|---|
| MOLDED 6 BASE LENSES | COATED FILMS | INITIAL (UNABRADED) % HAZE | POST- ABRASION % HAZE | DELTA HAZE |
| EX25L6B | EX25 | 0.66 | 8.29 | 7.63 |
| EX26L6B | EX26 | 0.66 | 5.94 | 5.28 |
| EX27 L6B | EX27 | 1.31 | 7.12 | 5.81 |
| EX28 L6B | EX28 | 0.68 | 13.00 | 12.32 |
| EX29 L6B | EX29 | 0.75 | 11.90 | 11.15 |
| EX30 L6B | EX30 | 1.20 | 12.30 | 11.10 |

Transmission Test

The block state transmission for selected samples were measured at normal incidence as a function of wavelength using a Lambda 1050 spectrophotometer (available from PerkinElmer, Waltham, Mass.). The block state was determined by the orientation of a pre-polarizer that resulted in the minimum transmission at a wavelength of 550 nm. The average (unweighted mean) block state transmission over the wavelength range of 450 nm to 650 nm was determined. The transmission in the block state was measured for the optical assembly of Example 12 for incident light normal to the lens at the apex of the lens and for a portion of the same sheet of PE12 used in Example 12. The average transmission was 0.087 percent for the sheet of PE12 and 0.043 percent for Example 12. The transmission in the block state was measured for the optical assembly of Example 19 for incident light normal to the lens at the apex of the lens and for a portion of the same sheet of PE12 used in Example 19. The average transmission was 0.087 percent for the sheet of PE12 and 0.040 percent for Example 19.

The reflectance in the block state can be estimated as 100% minus the transmission by neglecting absorption. This gives an average reflectance in the wavelength range of 450 nm to 650 nm of greater than 99.9 percent for each of the tested samples.

Bonding Test 1

A multilayer optical film reflective polarizer (Advanced Polarizing film (APF) available from 3M Company, St. Paul, Minn.) was thermoformed into an 8 Base lens shape as generally described in U.S. Pat. No. 9,557,568 (Ouderkirk et al.).

Optical film insert molding was done on a Krauss Maffei 65 ton injection molding machine using an 8 Base lens blank injection molding tool. The thermoformed optical film was trimmed to the correct size to fit in the injection molding tool and was then placed on the convex side of the molding tool. Next the injection molding process was performed using PMMA molding material (Optimas 7500, Mitsubishi Gas Chemical Company, Inc) injected at a temperature of 276° C. into the molding tool cavity at 99° C. The resulting optical assembly was removed from the injection molding machine after a total injection molding cycle time of 66 seconds. Visual inspection of the film before and after the thermoforming and molding process showed no noticeable change in reflectivity.

The bond strength of the film to the lens was tested using a cross hatch tape pull test. This was done by scoring through the insert molded film on the lens surface in a cross hatch pattern, adhering tape over the scored cross hatch film surface, and pulling the tape off the surface. It was found that the multilayer optical film separated with a portion of the optical film being removed with the tape and another portion remaining on the lens. It was concluded that the PMMA molding material bonded strongly to the outer layer of the APF film which was a blend of polycarbonate and copolyesters (PC:coPET). For comparison, a cyclic olefin resin was injection molded onto a thermoformed APF in a similar process and the adhesion was tested as described above. It was found that the APF was entirely removed with the tape leaving no optical film on the lens.

Bonding Test 2

An optical stack was thermoformed into an 8 Base lens shape as generally described in U.S. Pat. No. 9,557,568 (Ouderkirk et al.). The optical stack was a multilayer optical film reflective polarizer (APF) with a protective film liner (OCPET NSA33T, Sun A Kaken Co, Ltd) disposed on each major surface of the APF. The liners were aligned with the APF and did not extend past the edges of the APF.

Optical stack insert molding was done on a Krauss Maffei 65 ton injection molding machine using an 8 Base lens blank injection molding tool. The thermoformed optical stack was trimmed to the correct size to fit in the injection molding tool and one of the liners were removed. The thermoformed optical stack and was then placed on the convex side of the molding tool with the remaining liner facing away from the mold cavity. Next the injection molding process was performed using PMMA molding material (Optimas 7500, Mitsubishi Gas Chemical Company, Inc) injected at a temperature of 268° C. into the molding tool cavity at 82° C. The resulting optical assembly was removed from the injection molding machine after a total injection molding cycle time of 66 seconds.

The bond strength of the film to the lens was tested as in Bonding Test 1. It was found that the multilayer optical film separated with a portion of the optical film being removed with the tape and another portion remaining on the lens.

Retardance Test

To determine the retardance of a lens made by injection molding, a lens was formed generally as described for Bonding Test 1 without the optical film and the retardance was measured using an Axometrics AxoScan™ Muller matrix polarimeter (available from Axometrics, Inc., Huntsville, Ala.). The lens had an approximately constant thickness of about 2 mm, a radius of curvature of 36 mm and a diameter of 70 mm. The retardance in nm as a function of polar and azimuthal angles (using spherical coordinates with polar angle measured from the apex of the lens) is show in Table 10. A wavelength of 550 nm was used and the results were averaged over 20 scans. Duplicate points were measured to determine the repeatability of the results (e.g., a polar angle of 48 degrees and an azimuthal angle of 0 degrees is equivalent to a polar angle of minus 48 degrees and an azimuthal angle of 180 degrees. The retardance varied more in a direction from the gate side (polar angle about −48 degrees and azimuth angle of about 0 degrees) to the opposite side of the lens and varied less in an orthogonal direction. The retardance was higher than 10 nm in a small region near the gate and was less than 10 nm over at least 80% of the lens. It is believed that a longer annealing time would reduce the retardance near the gate so that the retardance would be less than 10 nm throughout the lens.

TABLE 10

| Azimuthal | RETARDANCE (nm) | | | | | | | | |
|---|---|---|---|---|---|---|---|---|---|
| | Polar Angle (deg) | | | | | | | | |
| Angle (deg) | −48 | −36 | −24 | −12 | 0 | 12 | 24 | 36 | 48 |
| 0 | 30 | 6.4 | 2 | 1.7 | 1.4 | 1 | 0.66 | 1 | 5.8 |
| 30 | 17 | 4.2 | 2.3 | 1.7 | 1.4 | 1 | 0.9 | 0.9 | 4.3 |
| 60 | 9.3 | 2.3 | 2.4 | 1.7 | 1.3 | 1.3 | 1.5 | 1.2 | 3.5 |
| 90 | 5.5 | 1.4 | 2.2 | 1.6 | 1.4 | 1.5 | 2 | 1.5 | 4.97 |
| 120 | 3.4 | 1.3 | 1.7 | 1.3 | 1.4 | 1.6 | 2.2 | 2.1 | 8.3 |
| 150 | 4.2 | 1.2 | 1 | 1.1 | 1.3 | 1.7 | 2.1 | 3.5 | 14.7 |
| 180 | 5.6 | 1.3 | 0.7 | 1 | 1.4 | 1.6 | 1.9 | 5.3 | 28.4 |

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

All references, patents, and patent applications referenced in the foregoing are herein incorporated by reference in their entirety in a consistent manner. In the event of inconsistencies or contradictions between portions of the incorporated references and this application, the information in the preceding description shall control.

What is claimed is:

1. An optical assembly, comprising an optical element insert molded directly onto an optical stack, the optical stack comprising an optical film and a liner, the optical film being disposed between the optical element and the liner,
   wherein the optical film comprises a plurality of alternating polymeric layers reflecting or transmitting light primarily by optical interference, each location over at least 80% of a total area of the optical film having a reflectance greater than about 80% for normally incident light having a same predetermined wavelength and a same first polarization state,
   wherein the liner is removable from the optical film,
   wherein the optical film comprises a protective coating facing the liner and having an average thickness of no more than 30 micrometers, and
   wherein the protective coating comprises an at least partially cured composition, the composition comprising:
   a) 70 to 96 weight percent of urethane (meth)acrylate compound having an average (meth)acrylate functionality of 2 to 9.5, based on the total weight of components a) to d);
   b) 2 to 20 weight percent of (meth)acrylate monomer having a (meth)acrylate functionality of 1 to 2, based on the total weight of components a) to d), wherein the (meth)acrylate monomer does not comprise a urethane (meth)acrylate compound;
   c) optional 0.5 to 2 weight percent of silicone (meth)acrylate, based on the total weight of components a) to d);
   d) optional effective amount of photoinitiator;
   e) optional inorganic nanoparticles; and
   f) optional solvent.

2. The optical assembly of claim 1, wherein for each location over at least 80% of a total area of the optical film, a difference between a reflectance of the optical film at the location before and after the liner is removed is less than about 5%.

3. The optical assembly of claim 1, wherein a melting temperature of the optical element is at least 50° C. larger than a glass transition temperature of the optical film.

4. The optical assembly of claim 1, wherein the optical element is insert molded directly onto the optical film, the optical film being diffusion bonded to the optical element.

5. The optical assembly of claim 1, wherein the optical element is a lens having an optical retardance varying more along a largest lateral dimension in a first direction and varying less along a largest lateral dimension in an orthogonal second direction, the optical retardance at each location on the lens being no more than about 10 nm.

6. The optical assembly of claim 1, wherein the urethane (meth)acrylate compound has a molecular weight of 1100 g/mole to 2100 g/mole and an acrylate equivalent weight of 307 g/equivalent to 220 g/equivalent.

7. The optical assembly of claim 1, wherein the urethane (meth)acrylate compound has a molecular weight of 1100 g/mole to 1300 g/mole and an acrylate equivalent weight of 307 g/equivalent to 275 g/equivalent.

8. The optical assembly of claim 1, wherein the composition comprises 80 to 96 weight percent of the urethane (meth)acrylate compound and 2 to 12.5 weight percent of the (meth)acrylate monomer, the average (meth)acrylate functionality of the urethane (meth)acrylate compound being from 2 to 4.8, the protective coating having a best-fit spherical radius of curvature of 58 mm to 76 mm and a maximum displacement from a plane tangent to the protective coating at a center of the protective coating of 13 to 20 mm.

9. An optical assembly, comprising:
an integrally formed multilayer optical film; and
a first optical element injection insert molded directly onto the optical film, the optical film comprising a plurality of alternating polymeric layers reflecting or transmitting light primarily by optical interference, each location over at least 80% of a total area of the optical film having a reflectance greater than about 80% for normally incident light having a same predetermined wavelength and a same first polarization state,
wherein a melting temperature of the first optical element is substantially larger than a glass transition temperature of the optical film,
wherein the optical film comprises a protective coating having an average thickness of no more than 30 micrometers, the protective coating facing away from the first optical element, and
wherein the protective coating comprises an at least partially cured composition, the composition comprising:
a) 70 to 96 weight percent of urethane (meth)acrylate compound having an average (meth)acrylate functionality of 2 to 9.5, based on the total weight of components a) to d);
b) 2 to 20 weight percent of (meth)acrylate monomer having a (meth)acrylate functionality of 1 to 2, based on the total weight of components a) to d), wherein the (meth)acrylate monomer does not comprise a urethane (meth)acrylate compound;
c) optional 0.5 to 2 weight percent of silicone (meth) acrylate, based on the total weight of components a) to d);
d) optional effective amount of photoinitiator;
e) optional inorganic nanoparticles; and
f) optional solvent.

10. The optical assembly of claim 9, wherein the optical film is diffusion bonded to the first optical element.

11. The optical assembly of claim 9, wherein the urethane (meth)acrylate compound has a molecular weight of 1100 g/mole to 2100 g/mole and an acrylate equivalent weight of 307 g/equivalent to 220 g/equivalent.

12. The optical assembly of claim 9, wherein the urethane (meth)acrylate compound has a molecular weight of 1100 g/mole to 1300 g/mole and an acrylate equivalent weight of 307 g/equivalent to 275 g/equivalent.

13. The optical assembly of claim 9, wherein the composition comprises 80 to 96 weight percent of the urethane (meth)acrylate compound and 2 to 12.5 weight percent of the (meth)acrylate monomer, the average (meth)acrylate functionality of the urethane (meth)acrylate compound being from 2 to 4.8, the protective coating having a best-fit spherical radius of curvature of 58 mm to 76 mm and a maximum displacement from a plane tangent to the protective coating at a center of the protective coating of 13 to 20 mm.

14. An optical assembly, comprising:
an integrally formed multilayer optical film, the optical film comprising a plurality of alternating polymeric layers reflecting or transmitting light primarily by optical interference, each location over at least 90% of a total area of the optical film having a reflectance greater than about 90% for normally incident light having a same predetermined wavelength and a same first polarization state; and
an optical element insert molded directly onto the optical film, the optical film being diffusion bonded to the optical element,
wherein the optical film comprises a protective coating having an average thickness of no more than 30 micrometers, the protective coating facing away from the optical element, and
wherein the protective coating comprises an at least partially cured composition, the composition comprising:
a) 70 to 96 weight percent of urethane (meth)acrylate compound having an average (meth)acrylate functionality of 2 to 9.5, based on the total weight of components a) to d);
b) 2 to 20 weight percent of (meth)acrylate monomer having a (meth)acrylate functionality of 1 to 2, based on the total weight of components a) to d), wherein the (meth)acrylate monomer does not comprise a urethane (meth)acrylate compound;
c) optional 0.5 to 2 weight percent of silicone (meth) acrylate, based on the total weight of components a) to d);
d) optional effective amount of photoinitiator;
e) optional inorganic nanoparticles; and
f) optional solvent.

15. The optical assembly of claim 14, wherein the urethane (meth)acrylate compound has a molecular weight of 1100 g/mole to 2100 g/mole and an acrylate equivalent weight of 307 g/equivalent to 220 g/equivalent.

16. The optical assembly of claim 14, wherein the urethane (meth)acrylate compound has a molecular weight of 1100 g/mole to 1300 g/mole and an acrylate equivalent weight of 307 g/equivalent to 275 g/equivalent.

17. The optical assembly of claim 14, wherein the composition comprises 80 to 96 weight percent of the urethane (meth)acrylate compound and 2 to 12.5 weight percent of the (meth)acrylate monomer, the average (meth)acrylate functionality of the urethane (meth)acrylate compound being from 2 to 4.8, the protective coating having a best-fit spherical radius of curvature of 58 mm to 76 mm and a maximum displacement from a plane tangent to the protective coating at a center of the protective coating of 13 to 20 mm.

* * * * *